United States Patent [19]
Yamamoto et al.

[11] Patent Number: 5,841,755
[45] Date of Patent: *Nov. 24, 1998

[54] MAGNETOOPTICAL INFORMATION RECORDING AND REPRODUCING APPARATUS WHICH REPRODUCES INFORMATION BY DETECTING ONLY PORTIONS OF LIGHT FROM A RECORDING MEDIUM NOT SHIELDED BY A SHIELDING DEVICE

[75] Inventors: Masakuni Yamamoto, Yamato; Susumu Matsumura, Kawaguchi; Hiroaki Hoshi, Yokohama; Eiji Yamaguchi, Zama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 612,504

[22] Filed: Mar. 7, 1996

Related U.S. Application Data

[63] Continuation of Ser. No. 138,118, Oct. 10, 1993, abandoned.

[30] Foreign Application Priority Data

Oct. 21, 1992 [JP] Japan ................... 4-305907

[51] Int. Cl.$^6$ ........................... G11B 7/00
[52] U.S. Cl. ........................... 369/118; 369/124
[58] Field of Search ................... 369/112, 44.23, 369/44.24, 118, 13, 59, 124

[56] References Cited

U.S. PATENT DOCUMENTS

| | | | |
|---|---|---|---|
| 4,654,839 | 3/1987 | Endo | 369/44.24 |
| 4,682,315 | 7/1987 | Uejima | 369/44.24 |
| 4,726,685 | 2/1988 | Kobayashi et al. | 369/44.24 |
| 5,199,023 | 3/1993 | Yamamoto et al. | 369/275.4 |
| 5,206,852 | 4/1993 | Kim et al. | 369/118 X |

FOREIGN PATENT DOCUMENTS

| | | |
|---|---|---|
| 0498455 | 8/1992 | European Pat. Off. . |
| 59-77607 | 5/1984 | Japan . |
| 2-210625 | 8/1990 | Japan . |
| 4-155640 | 5/1992 | Japan . |

OTHER PUBLICATIONS

Patent Abstracts of Japan, Kokai No. 2–210625, vol. 14, No. 508, Nov. 1990.
Patent Abstracts of Japan, Kokai No. 3–63947, vol. 15, No. 224, Jun. 1991.
Patent Abstracts of Japan, Kokai No. 61–233443, vol. 11, No. 72, Mar. 1987.
Patent Abstracts of Japan, Kokai No. 60–253027, vol. 10, No.127, May 1986.
Patent Abstracts of Japan, Kokai No. 2–158930, vol. 14, No. 409, Sep. 1990.
Patent Abstracts of Japan, Kokai No. 1–52240, vol. 13, No. 253, Jun. 1989.

*Primary Examiner*—Paul W. Huber
*Attorney, Agent, or Firm*—Fitzpatrick, Cella, Harper & Scinto

[57] ABSTRACT

In a magnetooptical information recording-reproducing apparatus, recording of information is performed such that a laser beam is irradiated on a magnetooptical information recording medium via an optical head while applying a magnetic field to the beam irradiated portion of the recording medium onto which information pits are formed by utilizing the difference in the direction of magnetization thereof. The magnetooptical information recording-reproducing apparatus is provided with a band-like shielding plate which is arranged in an optical path of a reflected light from the recording medium upon application of the laser beam thereto in a direction perpendicular to tracks of the recording medium. Reproduction of information recorded on the recording medium is effected by detecting the beam which is not shielded by the shielding plate by use of a photodetector.

9 Claims, 37 Drawing Sheets

$\{(20-1)+(20-2)\}-\{(19-1)+(19-2)\}$ $\{(25-1)-(25-2)\}-\{(26-1)-(26-2)\}$

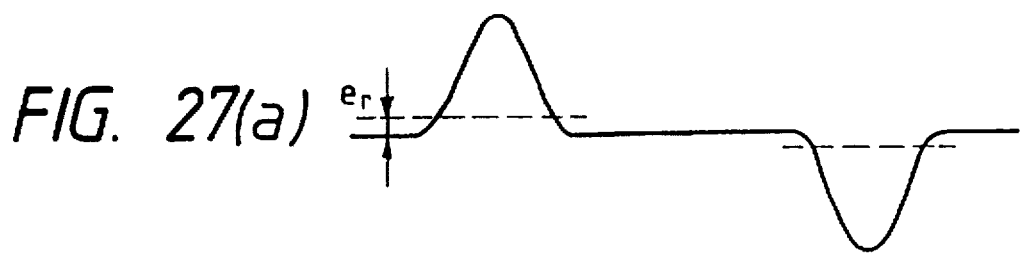
FIG. 27(a)
FIG. 27(b)
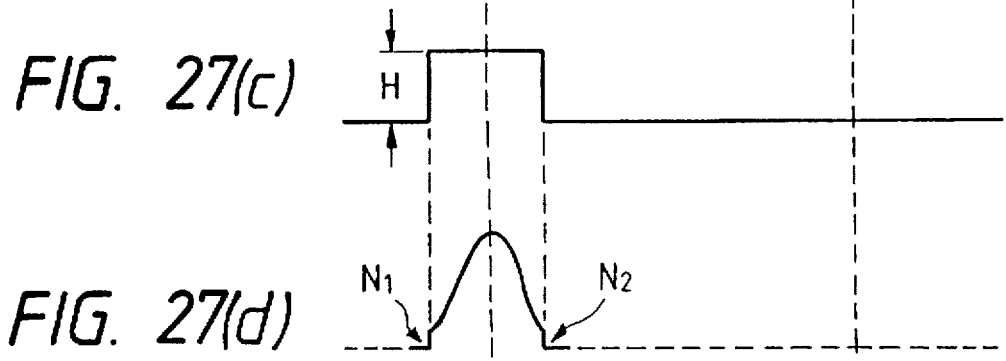
FIG. 27(c)
FIG. 27(d)
FIG. 27(e)
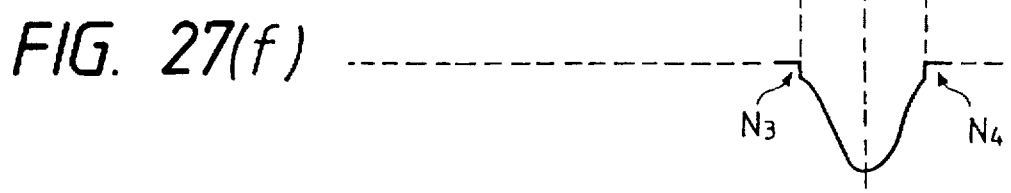
FIG. 27(f)

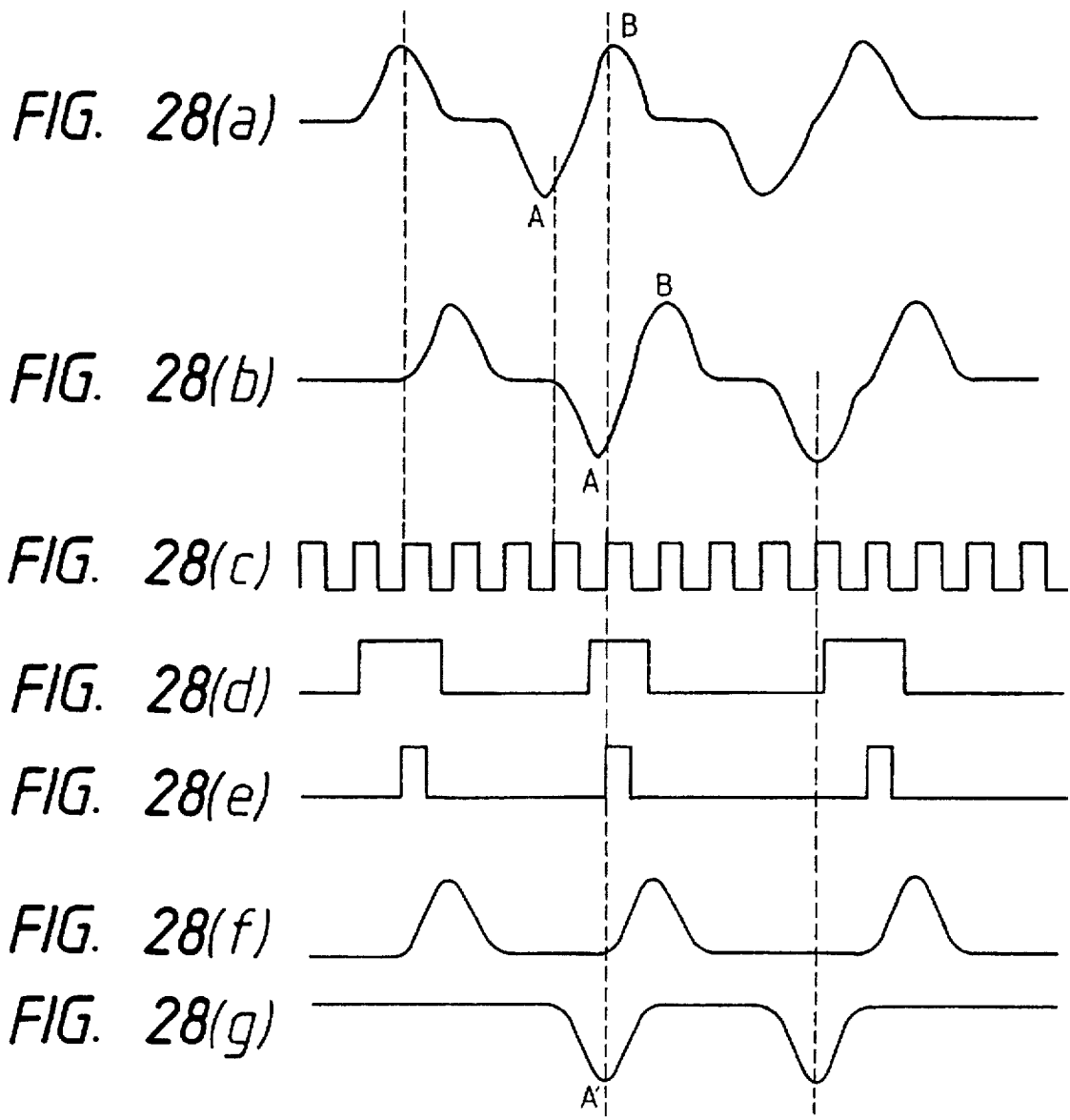

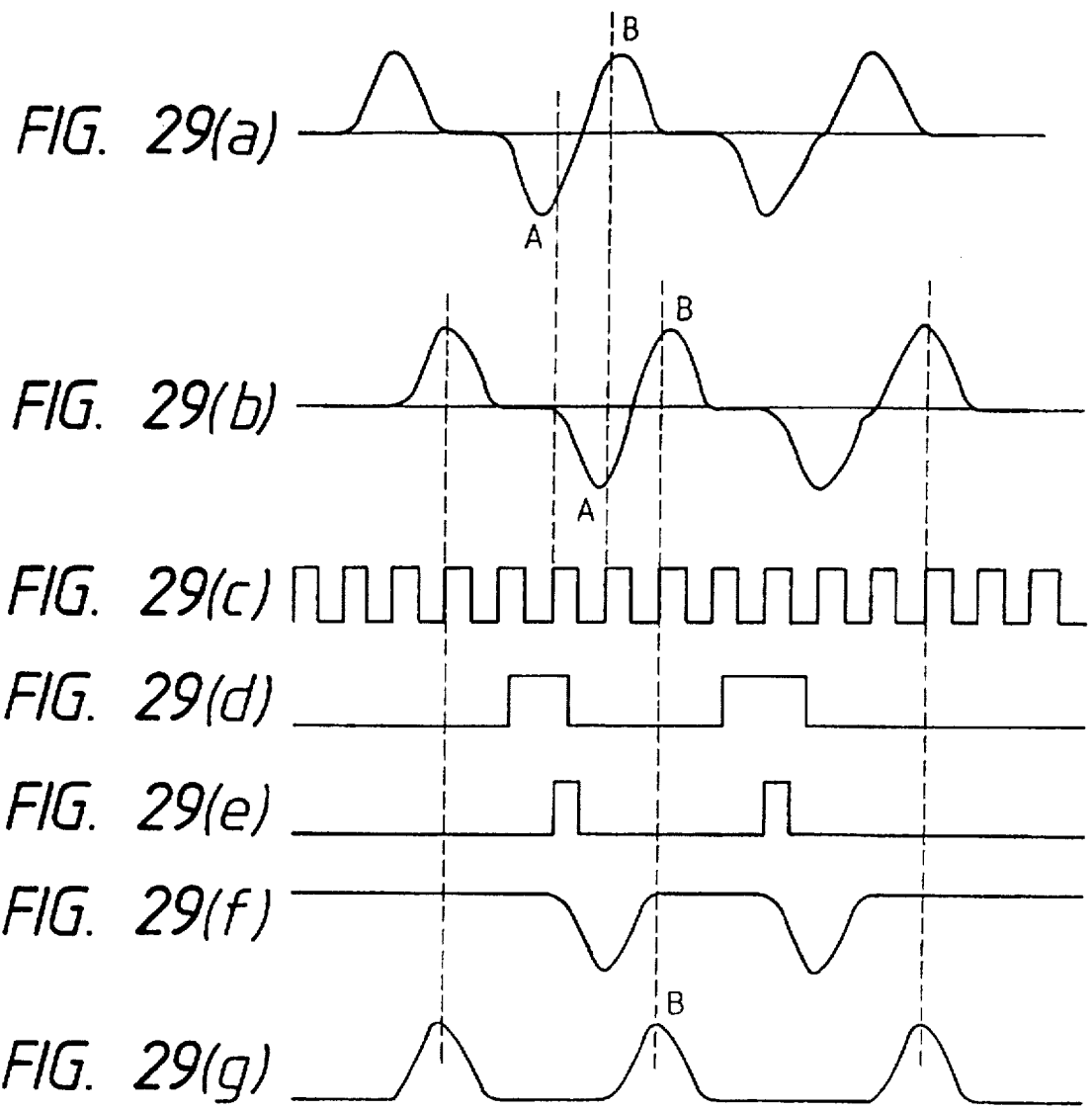

5,841,755

MAGNETOOPTICAL INFORMATION RECORDING AND REPRODUCING APPARATUS WHICH REPRODUCES INFORMATION BY DETECTING ONLY PORTIONS OF LIGHT FROM A RECORDING MEDIUM NOT SHIELDED BY A SHIELDING DEVICE

This application is a continuation of application Ser. No. 08/138,118, filed Oct. 20, 1993 now abandoned.

BACKGROUND OF THE INVENTION

1. Field of the Invention

The present invention relates to a magnetooptical information recording and reproducing apparatus for performing recording and/or reproduction of information with respect to a magnetooptical information recording medium by using an optical means.

2. Related Background Art

Recently, a magnetooptical information recording and reproducing apparatus using a magnetooptical disk as an information recording medium is considered as a promising apparatus because of its advantages such as a high portability, a large storage capacity, and an ability to perform erasure and rewriting of information. An optical head of such a conventional rewritable magnetooptical information recording and reproducing apparatus has an arrangement as shown in FIG. 1. Referring to FIG. 1, divergent light radiated from a semiconductor laser 101 as a light source is collimated into a parallel light beam through a collimator lens 102. This parallel light beam is guided to an objective lens 105 through a beam shaping prism 103 and a polarizing beam splitter 104 and converged by the objective lens 105 to form a light spot on a magnetic layer of a magnetooptical information recording medium 106. Meanwhile, a magnetic head 107 applies an external magnetic field to at least a region of the light spot.

Light reflected by the magnetooptical information recording medium 106 is returned to the polarizing beam splitter 104 through the objective lens 105. A portion of the reflected light is split by the polarizing beam splitter 104 and guided to a control optical system. In the control optical system, this split light beam is further split by another polarizing beam splitter 109. One of the split light beams is guided to a reproducing optical system 110 to obtain an information signal, and the other is transmitted through a condenser lens 116 and a half prism 117 and guided to a photodetector 120 via a photodetector 118 and a knife edge 119, thereby obtaining a control signal for performing focusing or tracking of the optical head.

The reproducing optical system 110 comprises a halfwave plate 111 for rotating the polarization direction of a light beam through 45 degrees, a condenser lens 112 for converging a light beam, a polarizing beam splitter 113 for splitting a light beam, and photodetectors 114 and 115 for detecting light beams split by the polarizing beam splitter 113. A reproduction signal is obtained by differentially detecting the output signals from the photodetectors 114 and 115.

FIG. 2 is a view for explaining the manner in which such a magnetooptical signal is obtained. In a magnetooptical information recording medium, information is recorded by using the difference in the direction of magnetization. Therefore, when linearly polarized light is radiated on the magnetooptical information recording medium, the polarization direction of this linearly polarized light rotates clockwise or counterclockwise depending on the direction of magnetization.

Assume, for example, that the polarization direction of linearly polarized light incident on an information recording medium is the direction of a coordinate axis P shown in FIG. 2, reflected light corresponding to downward magnetization is $R_+$ that is rotated through $+\theta_k$, and reflected light corresponding to upward magnetization is $R_-$ that is rotated through $-\theta_k$. In this case, if an analyzer is placed in the direction as shown in FIG. 2, light transmitted through the analyzer is A with respect to $R_+$, and B with respect to $R_-$. By detecting these light components by using photodetectors, information can be obtained as the difference in light intensity. In the conventional example shown in FIG. 1, the polarizing beam splitter 113 serves as an analyzer; that is, the polarizing beam splitter 113 functions as an analyzer in a direction rotated +45° from the axis P for one of the split light beams, and an analyzer in a direction rotated −45° from the axis P for the other. That is, the signal components obtained by the photodetectors 114 and 115 have opposite phases, so a reproduction signal reduced in noise can be obtained by differentially detecting the individual signals.

Information pits (to be referred to simply as pits hereinafter) are formed as the difference in the direction of magnetization in such an information recording medium. Methods for forming these pits are, as is well known, classified into pit position recording in which the significance of information is given to the center of each pit, and pit edge recording in which it is given to the edge of each pit.

In forming pits into an information recording medium by using an optical means, considerable variations occur in the sizes of the pits formed if the recording sensitivity of the pits is low with respect to heat generated by a light spot. However, the position of the center of each pit remains the same. In such a case, therefore, the pit position recording is conventionally adopted. If, on the other hand, the recording sensitivity of the pits is high with respect to heat generated by a light spot, variations in the sizes of the pits can be reduced to a certain predetermined amount or less. Therefore, the pit edge recording can be adopted in this case, and this makes it possible to increase the recording density. In consideration of these situations, researches for improving the recording sensitivity of a magnetooptical information recording medium have been made in recent years, and the pit position recording is beginning to be switched to the pit edge recording accordingly.

Conventionally, in reproduction from a recording medium recorded by this pit edge recording scheme, a position at which a reproduction signal associated with the pit position recording scheme, which is obtained by the optical head shown in FIG. 1, traverses a slice level that is provided electrically is obtained.

If, however, the recording density is further increased and the size of the smallest pit becomes equal to or smaller than that of a light spot, the transmission characteristics of the optical head and the like are degraded. This produces a variation in a DC component in the signal detected by the optical means, causing edge shifts if the edges of pits are detected at a constant slice level.

FIGS. 3A to 3D illustrate signals obtained by recording signals with the single frequency in a magnetooptical information recording medium and then reproducing them. Suppose the size of a reproduction spot on the information recording medium is 1.7 μm, the rotating speed of the medium is 2,400 rpm, and the recording radius is 32 mm. FIG. 3A shows the result when the recording frequency is set at 1 MHz, and FIG. 3B shows the result when it is set at 4

MHz. Both the signals shown in FIGS. 3A and 3B are obtained by the optical head shown in FIG. 1 (FIGS. 3C and 3D will be described later). As is apparent from FIGS. 3A and 3B, as the recording frequency increases, the signal amplitude decreases, i.e., the frequency characteristics are degraded.

FIGS. 4(a) and 4(b) show degradation in the frequency characteristics of random signals. Assume in this Figure and that signals with durations 3T, 1T, and 4T are sequentially, repeatedly recorded as recording signals. FIG. 4(a) represents a reproduction signal associated with the bit position recording, in which only deterioration in the frequency characteristics is taken into account. That is, if there is no degradation in the frequency characteristics, the amplitudes of 1T equals that of 3T or 4T as indicated by an alternate long and short dashed line S. If, however, the size of a pit corresponding to 1T decreases, the amplitude of 1T also decreases as indicated by a solid line S'. Therefore, if the position of an edge is detected at a position at which the signal traverses a constant slice level as in conventional systems, the width of 1T, which is originally A, is detected as C that is smaller than the original width, due to degradation in the frequency characteristics (the widths of 3T and 4T increase by an amount corresponding to this decrease). If the difference between S and S' is attributed to only the deterioration in the frequency characteristics, a width D of the two remains unchanged. Therefore, a full-width B at half maximum of the amplitude S' equals the original width of 1T.

As a means for solving the above edge shift problem, there is a method of forming a differential signal indicated by FIG. 4(b) by differentiating the signal indicated by FIG. 4(a), thereby detecting the position of an edge from the position of the peak of the differential signal. Although this differential signal can be obtained by performing electrical differentiation, problems of a group delay and the like arise in that case. The differential signal shown in FIG. 4(b) can also be obtained by an optical method.

FIGS. 5(a) through 5(d) are views showing the amplitude distributions, the phase distributions, and the polarized light distributions of reflected light beams of linearly polarized light incident on a magnetooptical information recording medium, which are measured at a position where the light beam emerges from the information recording medium, on the far field plane, and on the convergent plane of a condenser lens. Note that the influences of a phase plate and an analyzer are not illustrated in these figures. Referring to these figures FIG. 5(a) represents the reproduction position of a light spot formed by an objective lens, in which a case [I] shows a state in which downward magnetization is reproduced, a case [II] shows a state in which upward magnetization is reproduced, a case [III] shows a state in which magnetization is downward on the left side of an edge portion of a pit, and a case [IV] shows a state in which magnetization is upward on the left side of an edge portion of a pit.

T (T') indicates a direction parallel to tracks, which is the scanning direction of a light spot. FIG. 5(b) shows the distributions of reflected light beams in the cases [I] to [IV], measured immediately after the beams emerge from the magnetooptical medium. Assume in these figures that the incident light is linearly polarized light of p-polarized light similar to that explained in FIG. 2. Referring to FIG. 5(b), (b-1) indicates the amplitude distribution of the p-polarized light; (b-2), the amplitude distribution (its magnitude is ignored) of the s-polarized light; (b-3), the phase distribution of the s-polarized light with reference to the p-polarized light; (b-4), the polarized state on the left side of the light beam; and (b-5), the polarized state on the right side of the light beam. The right and the left sides of the light beam correspond to the leading and trailing sides of the light beam, respectively, with respect to a direction in which the light spot scans parallel to tracks.

FIG. 5(c) shows the distributions on the far field plane, and FIG. 5(d) shows the distributions on the convergent plane of the condenser lens. More specifically, (c-1) and (d-1) represent the amplitude distributions of the p-polarized light; (c-2) and (d-2), the amplitude distributions (their magnitudes are ignored) of the s-polarized light; (c-3) and (d-3), the phase distributions of the s-polarized light with reference to the p-polarized light; (c-4) and (d-4), the polarized states on the left side of the light beam; and (c-5) and (d-5), the polarized states on the right side of the light beam.

In the case [I] of downward magnetization, the amplitude distributions of the p-polarized light and the s-polarized light at the position (see FIG. 5(b)) where the light beam emerges from the magnetooptical medium have the same symmetrical shape. In this case, the polarized light distribution is also symmetrical, and the polarized light is linearly polarized light which is rotated clockwise such as the one shown in FIG. 1. At this point, the phase difference between the p-polarized light and the s-polarized light is 0. The amplitude distributions of the p-polarized light and the s-polarized light are also symmetrical on the far field plane FIG. 5(c) and the convergent plane FIG. 5(d). At these positions, the phase of the s-polarized light remains 0, and the polarized states on the right and the left sides remain unchanged.

In the case [II] of upward magnetization, the amplitude distributions of the p-polarized light and the s-polarized light at the position where the light beam emerges from the magnetooptical medium are symmetrical as in the case [I]. The phase of the s-polarized light, however, is different by $\pi$ from that of the case [I], and the polarized light is linearly polarized light which is rotated counterclockwise, opposite to that of the case [I], on each of the right and the left sides. The amplitude distributions of the p-polarized light and the s-polarized light are also symmetrical on the far field plane (c) and the convergent plane (d), and the phase of the s-polarized light is still $\pi$. The polarized light is also linearly polarized light which is rotated counterclockwise on each of the right and the left sides.

In the case [III] in which magnetization is downward on the left side of the pit edge, the amplitude distribution of the p-polarized light is symmetrical at the position where the light beam emerges from the magnetooptical medium, like in the cases [I] and [II], whereas the amplitude distribution of the s-polarized light at that position is split into two parts, and its phase distribution is 0 on the left side and $\pi$ on the right side. The polarized light in this state is linearly polarized light which is rotated clockwise, on the left side, and linearly polarized light which is rotated counterclockwise, on the right side.

On the far field plane FIG. 5(c), the amplitude distribution of the p-polarized light is symmetrical, and the amplitude distribution of the s-polarized light remains split into two parts. However, the phase distribution of the s-polarized light changes; the phase is $-\pi/2$ on the left side and $+\pi/2$ on the right side. That is, the polarized light is, for example, right-handed elliptically polarized light, on the left side, and left-handed elliptically polarized light, on the right side. These elliptically polarized light components are the same in the ellipticity and the magnitude, and their major axes are in the direction of the p-polarized light.

When the light beam propagates to the convergent plane FIG. 5(d), the amplitude distribution of the p-polarized light is symmetrical, and the amplitude distribution of the s-polarized light remains split into two parts. However, the phase distribution of the s-polarized light returns to its original state, i.e., the phase is 0 on the left side and π on the right side. Therefore, the polarized light returns to the linearly polarized light which is rotated clockwise, on the left side, and the linearly polarized light which is rotated counterclockwise, on the right side.

In the case [IV] in which magnetization is upward on the left side of the pit edge, each state is the reverse in the right-and-left direction of the corresponding state in the case [III].

Focusing attention on the fact that on the convergent plane shown in FIG. 5 (5), the polarized light on each of the right and the left sides is linearly polarized light and the polarized states differ from one another in the cases [I] to [IV], a well-known conventional example (see the specification of Japanese Patent Application No. 2-279710) discloses a method in which a photodetector divided into two parts in a direction parallel to tracks is placed in the vicinity of the convergent plane, and a reproduction signal associated with the pit edge recording or a reproduction signal associated with the pit position recording is detected by using the difference signal or the sum signal from this two-segment photodetector. This method will be described in detail below with reference to FIGS. 6 to 8(b).

FIG. 6 shows a conventional reproducing optical system of an optical head for detecting optical pit edges. Note that the arrangement shown in FIG. 1 is usable as the other portion of this optical head. Referring to FIG. 6, the same reference numerals 111, 112, and 113 as in FIG. 1 denote the same parts, i.e., a halfwave plate, a condenser lens, and a polarizing beam splitter, respectively. The division lines of two-segment photodetectors 121 and 122 correspond to directions perpendicular to tracks (directions T and T') of an information recording medium (that is, when the tracks are projected onto these two-segment photodetectors by using this optical head, the directions of these tracks become perpendicular to the division lines). Amplifiers 123, 124, and 125 are used to perform differential detection, and a reproduction signal 126 is associated with the pit edge recording.

FIGS. 7A to 7F are views for explaining changes in light intensity on the two-segment photodetectors 121 and 122 when a light spot moves from a pit of downward magnetization to a pit of upward magnetization via a boundary (edge) at which the magnetization is inverted. FIGS. 7A, 7B, and 7C illustrate the states of the two-segment photodetector 121, and FIGS. 7D, 7E, and 7F illustrate the states of the two-segment photodetector 122. In each of FIGS. 7A to 7F, the X axis indicates the position on the two-segment photodetector illustrated below the axis, and the Y axis indicates the light intensity on the division line of the two-segment photodetector.

When the light spot exists on the pit of downward magnetization, the light intensity distributions on the two-segment photodetectors 121 and 122 are those shown in FIGS. 7A and 7D, respectively. The shape of each of these distributions is symmetrical about the Y axis, and their intensity peaks are present on the Y axis. The peak shown in FIG. 7A is larger. In this case, detection signals obtained by individual photodetectors 121-1 and 121-2 of the two-segment photodetector 121 are identical with each other, and those obtained by individual photodetectors 122-1 and 122-2 of the two-segment photodetector 122 are also identical with each other. Therefore, both signals obtained by using the differential detection amplifiers 123 and 124 are 0, and so a signal obtained by the differential detection amplifier 125 is also 0.

When, in contrast, the light spot exists on the pit of upward magnetization, the light intensity distributions on the two-segment photodetectors 121 and 122 are those shown in FIGS. 7C and 7F whose relationship is the reverse of that between FIGS. 7A and 7D. Also in this case, the detection signals obtained by the individual photodetectors 121-1 and 121-2 are the same, and those obtained by the individual photodetectors 122-1 and 122-2 are the same. Therefore, all the signals obtained by the differential detection amplifiers 123, 124, and 125 are 0.

When the light spot is at the position where the magnetization is inverted from the downward one to the upward one, the light intensity distributions on the two-segment photodetectors 121 and 122 are those shown in FIGS. 7B and 7E, respectively. In each of these distributions, the distribution peaks are present on both the (+) and the (−) sides of the X axis about the Y axis. The peak on the (−) side is higher in the distribution shown in FIG. 7B, and the peak on the (+) side is higher in the distribution shown in FIG. 7E. In this case, the differential amplifier 123 calculates (output signal from photodetector 121-2)—(output signal from photodetector 121-1), yielding a signal with a negative value. The differential amplifier 124 calculates (output signal from photodetector 122-2) (output signal from photodetector 122-1), yielding a signal with a positive value. The differential amplifier 125 calculates (output signal from differential amplifier 124)—(output signal from differential amplifier 123), yielding a signal with a positive value.

More specifically, when the light spot moves from downward magnetization to upward magnetization, a peak signal with a positive value is obtained as the reproduction signal 126 associated with the pit edge recording at the position where the magnetization is inverted. Movement of the light spot from upward magnetization to downward magnetization can also be explained in the same manner. In this case, a peak signal with a negative value is obtained at the position of inversion. According to this method, a signal on a pit is 0 at any instant, and a peak appears only at a boundary. This reduces an influence caused by changes in the transmission characteristics of the optical head or the like, which are derived from the size differences between the pits. Therefore, a variation in the DC component also decreases, eliminating the problem of edge shifts.

FIGS. 8(a) and 8(b) illustrate the reproduction signal 126 (edge detection signal) obtained by the optical head shown in FIG. 6. Referring to these figures FIG. 8(a) indicates an example of a pit formed by the pit edge recording, in which hatched portions represent upward magnetization and other blank portions represent downward magnetization. As the resulting reproduction signal, an edge detection signal indicated in FIG. 8(b) is obtained. The positions of edges can be known by detecting the positions of positive and negative peaks from this signal.

Referring back to FIG. 6, this optical head further comprises addition detection amplifiers 127 and 128, and a differential detection amplifier 129. A reproduction signal 130 is associated with the pit position recording and is equivalent to the signal obtained by the optical head shown in FIG. 1.

As a means for reducing the degradation in the frequency characteristics mentioned earlier with reference to FIGS. 3A to 3D and FIGS. 4(a) and 4(b), an apparatus described in Japanese Laid-Open Patent Application No. 2-210625 uses an optical filter in a reproducing optical system. FIGS. 4(a) and 4(b) explain only the influence of degradation of the frequency characteristics with respect to random signals. If, however, the sizes of pits recorded in a recording medium are further decreased to be about half that of a light spot or smaller than that, a small pit sandwiched between large pits is adversely affected not only by degradation in the frequency characteristics but also by intersymbol interference, as shown in FIGS. 9(a) and 9(b). That is, although the width D remains unchanged in FIGS. 4(a) and 4(b), it is widened to G in FIG. 9(a) (other symbols in FIGS. 9(a) and 9(b) will be described below).

In the edge detection performed by differentiation, however, such as in the above conventional example, a width F is detected as shown in FIGS. 9(a) and 9(b); that is, a value larger than the original width of 1T is detected. An optical filter described in Japanese Laid-Open Patent Application No. 2-210625 improves the frequency characteristics by decreasing the degree of modulation of low-frequency components and increasing that of high-frequency components. Although Japanese Laid-Open Patent Application No. 2-210625 explains an operation of this optical filter with respect to pits in the form of projections and recesses, it describes that the optical filter is also applicable to magnetooptical pits. The optimal value of the optical filter, however, is not optimal for magnetooptical pits, since there is a difference in the behavior of a reflected light beam from a recording medium between pits in the form of projections and recesses and magnetooptical pits. In addition, Japanese Laid-Open Patent Application No. 2-210625 does not mention the intersymbol interference.

A method of correcting edge shifts occurring in recording of high-density digital magnetic patterns as described above is disclosed in Japanese Laid-Open Patent Application No. 59-77607. In this method, digital data to be recorded is input to identify the directions and the amounts of shifts to be produced in reproduction, and recording timings are so corrected as to cancel these shift directions and shift amounts. In addition, in correspondence with a peak shift and a stream shift inherent in a magnetic recording apparatus, four types of timing correction are selectively performed in accordance with adjacent domain lengths: the recording timing is advanced by a predetermined amount from a reference timing, delayed by a predetermined amount from the reference timing, largely delayed from the reference timing, or set at exactly the same timing as the reference timing. In this conventional example, however, if a disk-like recording medium which rotates at a constant rotating speed is used, the linear velocity changes according to the radius of each information track, changing the individual domain lengths in a domain pattern. Therefore, no accurate correction can be performed with a constant recording timing correction amount. This is so because the edge shift amount depends on neighboring domain lengths.

SUMMARY OF THE INVENTION

The present invention has been made in consideration of the above situations and has as its object to provide a magnetooptical information recording and reproducing apparatus capable of improving relative frequency characteristics, reducing noise components, or reducing intersymbol interference, in recording and reproduction of information with respect to a magnetooptical recording medium.

In order to achieve the above object of the present invention, there is provided a magnetooptical information recording and reproducing apparatus for magnetoopotically recording information by radiating, via an optical head, laser light onto a magnetooptical information recording medium which records information pits by using the difference in the direction of magnetization, and applying a magnetic field to this irradiated portion, and/or optically reproducing the information by detecting light reflected by the irradiated portion by using photodetectors, wherein a band-like shielding plate is arranged in an optical path of the reflected light from the magnetooptical recording medium in a direction perpendicular to tracks of the magnetooptical information recording medium, and the information is reproduced by detecting light beams not shielded by the shielding plate by using the photodetectors.

According to another aspect of the present invention, there is provided a magnetooptical information recording and reproducing apparatus for magnetoopotically edge-recording information by radiating, via an optical head, laser light onto a magnetooptical information recording medium, which records information pits by using the difference in the direction of magnetization, and in which the significance of information is given to the boundary (edge) of each information pit, and applying a magnetic field to this irradiated portion, and/or edge-reproducing the information by optically detecting the positions of the information pits from reflected light by using photodetectors, and detecting the boundary (edge) of each information pit from a position at which the detection signal traverses a predetermined value, wherein the minimum length of the information pits recorded on the magnetooptical information recording medium in the direction of tracks is set to about ½ to about ⅖ the diameter of a light spot formed during reproduction.

According to still another aspect of the present invention, there is provided a magnetooptical information recording and reproducing apparatus for magnetoopotically edge-recording information by radiating, via an optical head, laser light onto a magnetooptical information recording medium, which records information pits by using the difference in the direction of magnetization, and in which the significance of information is given to the boundary (edge) of each information pit, and applying a magnetic field to this irradiated portion, and/or edge-reproducing the information by optically detecting the boundaries (edges) of the information pits from reflected light by using photodetectors, and detecting the boundary (edge) of each information pit from a position at which the detection signal exhibits a peak value, comprising waveform memory means for storing the waveform of a reproduction signal for a predetermined time period, and reading means for reading out a signal waveform stored beforehand in the waveform memory means in synchronism with a reproduction clock signal, wherein the information is reproduced by using a signal, which is obtained by performing arithmetic processing for the waveform of the reproduction signal and the waveform of the readout signal, as a new reproduction signal.

According to still another aspect of the present invention, there is provided a magnetooptical information recording and reproducing apparatus for magnetooptically edge-recording information by radiating, via an optical head, laser light onto a magnetooptical information recording medium, which records information pits by using the difference in the direction of magnetization, and in which the significance of information is given to the boundary (edge) of each information pit, and applying a magnetic field to this irradiated portion, and/or edge-reproducing the information by optically detecting the boundaries (edges) of the information pits from reflected light by using photodetectors, and detecting the boundary (edge) of each information pit from a position at which the detection signal exhibits a peak value, comprising identification means for receiving digital data and identifying the direction and the amount of a shift of the boundary position of each information pit obtained from a reproduction signal generated when the digital data is recorded and then reproduced, and timing correction means for changing a recording timing for the information recording medium so as to cancel the shift amount and the shift direction identified by the identification means.

BRIEF DESCRIPTION OF THE DRAWINGS

FIGS. 27(a) through 27(f) are timing charts for explaining the operation of the waveform memory means shown in FIG. 26;

FIGS. 28(a) through 28(g) are timing charts for explaining the operation of the reproduction signal correction circuit shown in FIG. 25;

FIGS. 29(a) through 29(g) are also timing charts for explaining the operation of the reproduction signal correction circuit shown in FIG. 25;

DETAILED DESCRIPTION OF THE PREFERRED EMBODIMENTS

Figures 10A, 10B:
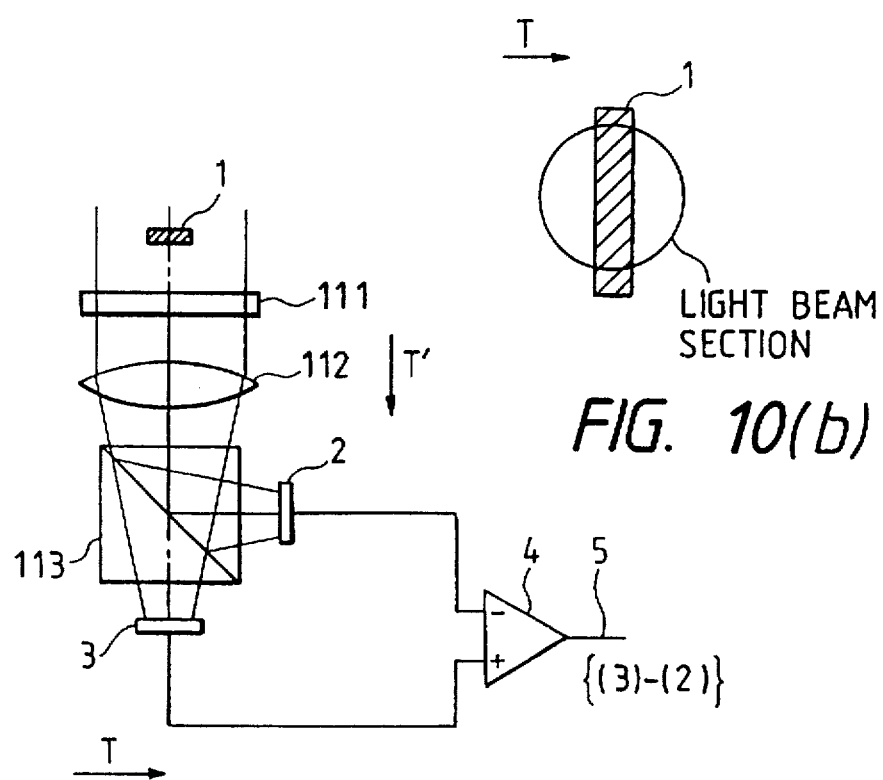
FIGS. 10(a) and 10(b) are views showing a reproducing optical system according to the present invention.
Figure 11:
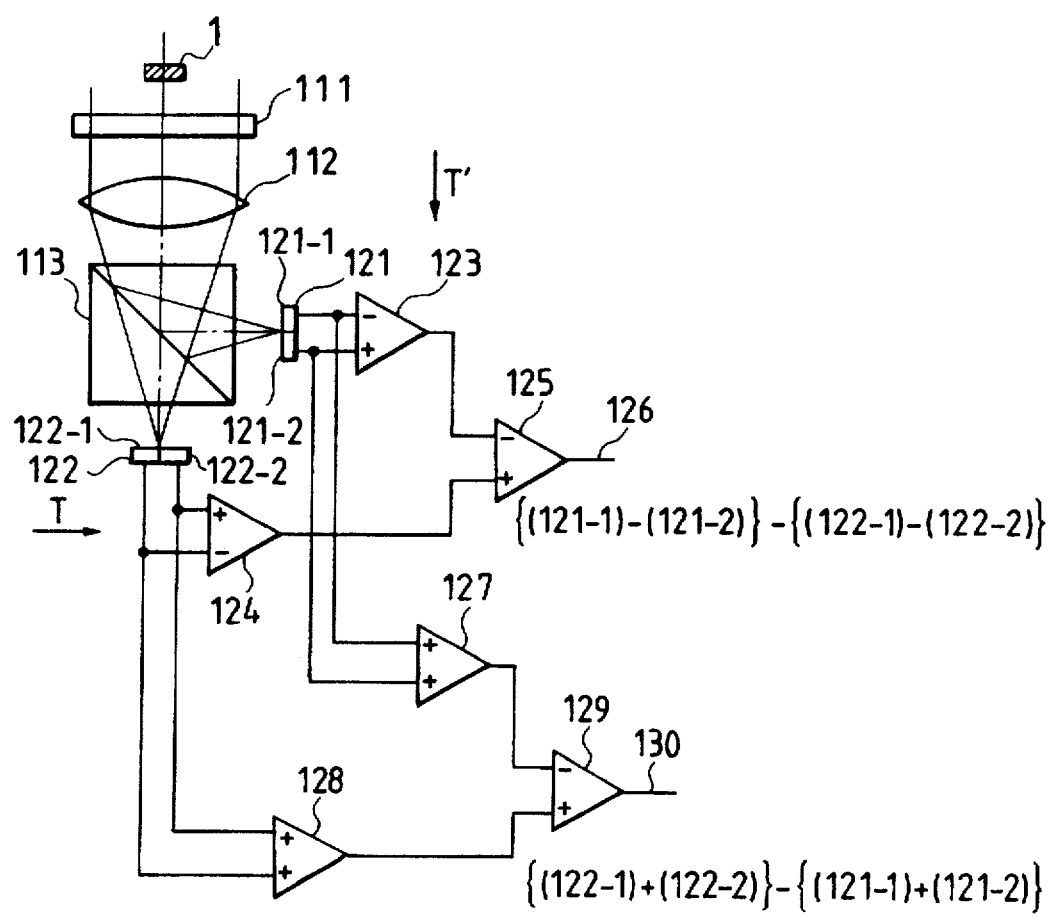
FIG. 11 is a view showing a reproducing optical system according to the present invention.

The embodiments of the present invention will be described in detail below with reference to the accompanying drawings. Each of FIGS. 10 and 11 shows a reproducing optical system of an optical head used in a magnetooptical information recording and reproducing apparatus of the present invention. Each reproducing optical system of the present invention is used in place of the reproducing optical system 110 shown in FIG. 1. The reproducing optical system shown in FIG. 10(a) detects the boundary (edge) of a pit from a position at which a reproduction signal which is obtained by optically detecting the position of the pit, traverses a predetermined slice level, or, electrically differentiates a reproduction signal which is obtained by optically detecting the position of a pit, thereby detecting the edge of the pit from the position of the peak of that signal. The reproducing optical system shown in FIG. 11 detects the edge of a pit from the position of the peak of a reproduction signal which is obtained by optically detecting the edge of the pit. The other portion of each optical head is identical with that of the conventional example shown in FIG. 1, so a detailed description thereof will be omitted.

Figure 1:
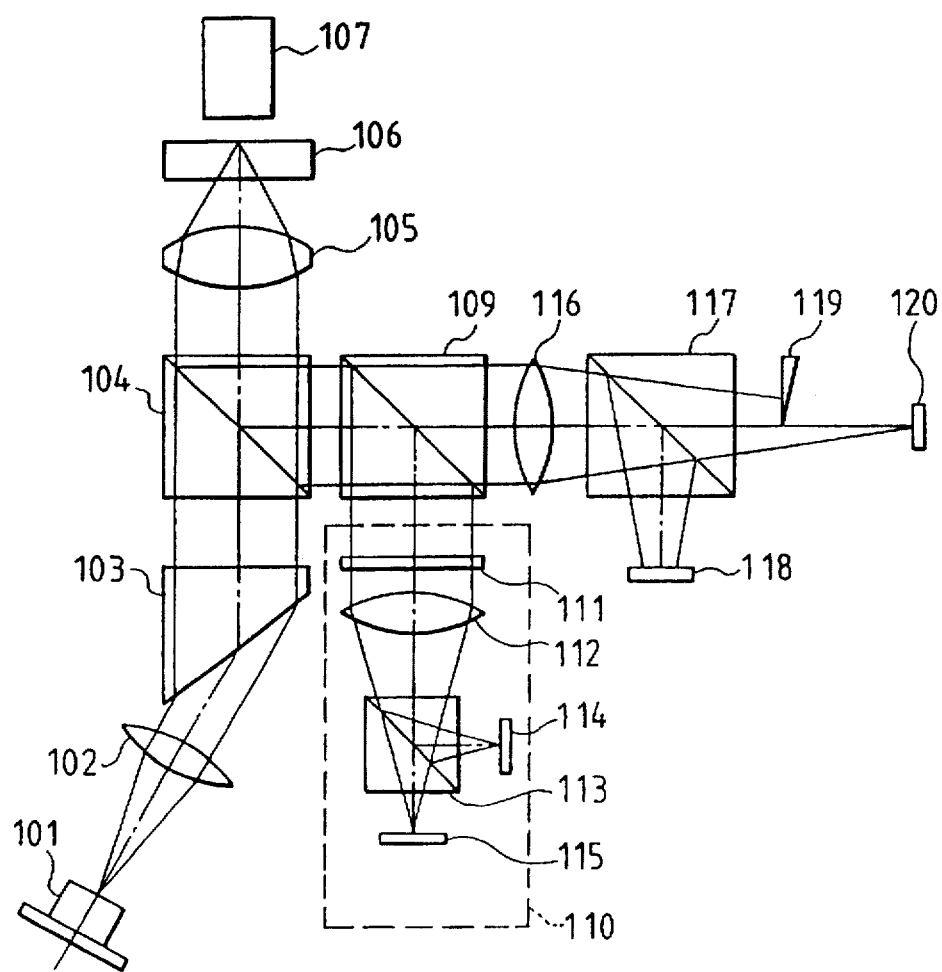
FIG. 1 is a view showing a conventional optical head for performing pit position detection.

Referring to FIG. 10(a), the same reference numerals 111, 112, and 113 as in FIG. 1 denote the same parts, i.e., a halfwave plate, a condenser lens, and a polarizing beam splitter, respectively. A band-like shielding plate 1 is arranged in a reflected light beam from a recording medium in a direction perpendicular to a track direction (a direction T or T' in FIGS. 10(a) and 10(b)). Photodetectors 2 and 3 detect light components not shielded by the shielding plate 1 but propagating around the shielding plate 1. Assuming that the detection signals obtained by the photodetectors 2 and 3 are signals (2) and (3), respectively, a differential amplifier 4 which receive these signals performs arithmetic processing {detection signal (3)—detection signal (2)}, yielding a difference signal 5. The difference signal 5 is a signal for optically detecting a pit position.

Figure 6:
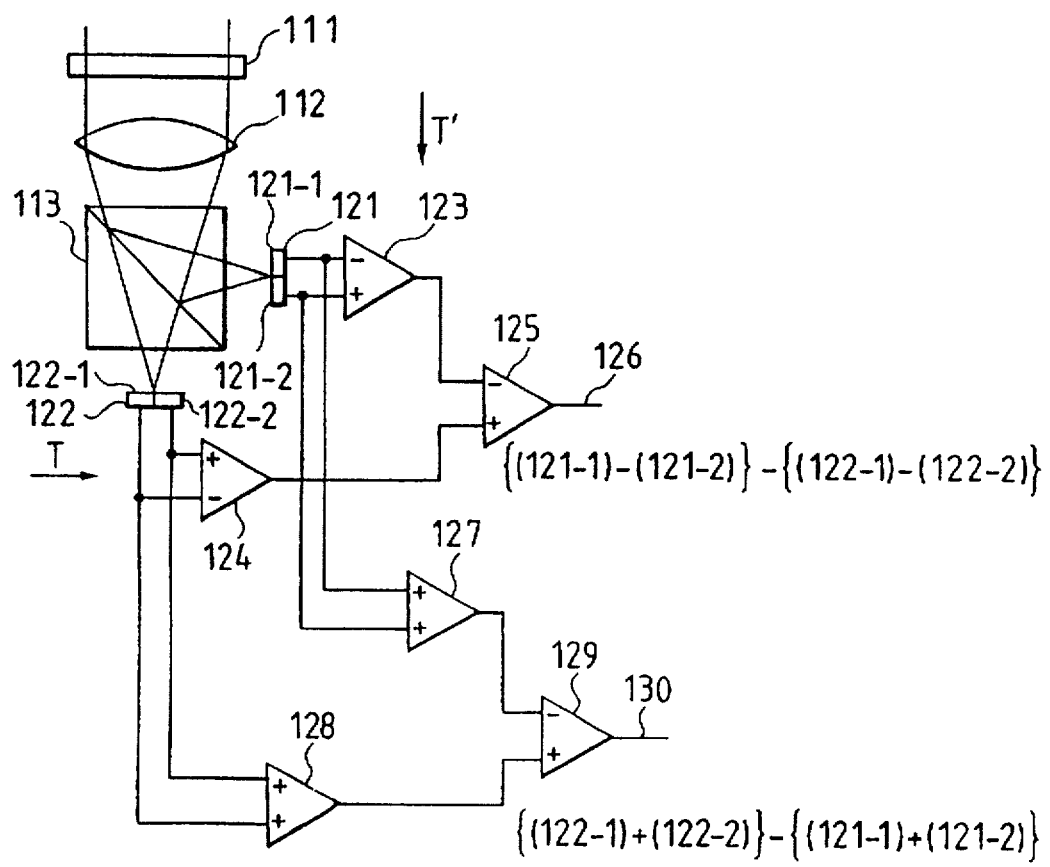
FIG. 6 is a view showing a conventional reproducing optical system for performing pit edge detection.
Figure 7A:
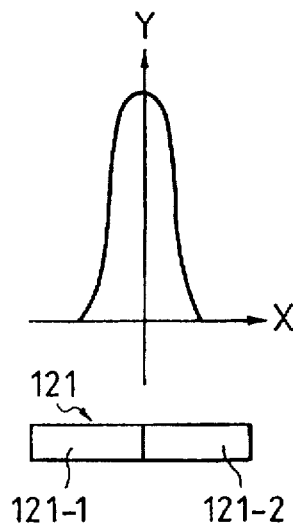
FIGS. 7A to 7F are views for explaining the reproduction principle of the conventional example shown in FIG. 6.
Figure 7B:
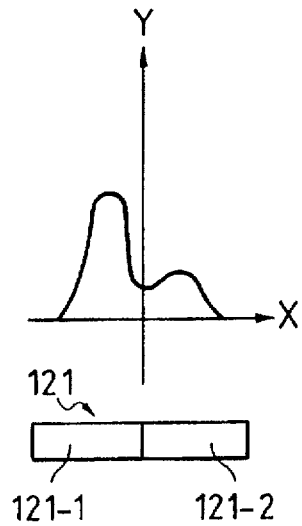
Figure 7C:
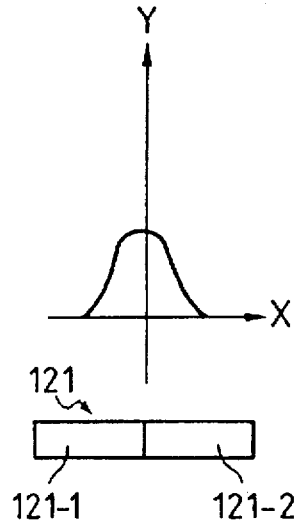
Figure 7D:
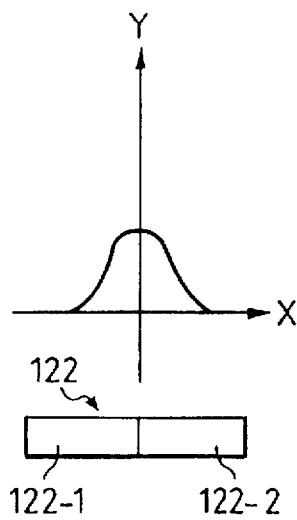
Figure 7E:
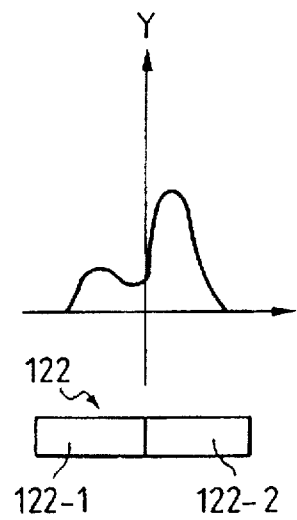
Figure 7F:
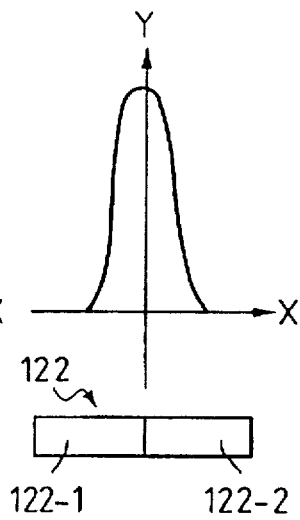

Referring to FIG. 11, a shielding plate 1 is identical with that shown in FIGS. 10(a) and 10(b). Other components are the same as those shown in FIG. 6. Light components propagating around the shielding plate 1 are detected and processed by two-segment photodetectors 121 and 122. A signal 126 is a signal for optically detecting a pit edge, and a signal 130 is a signal for optically detecting a pit position, like the difference signal 5 shown in FIGS. 10(a) and 10(b).

Figure 12:
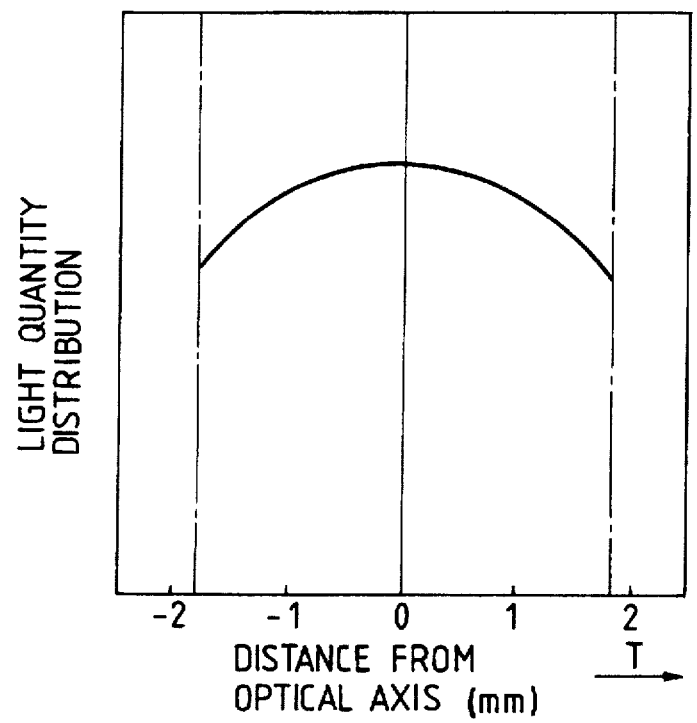
FIG. 12 is a graph for explaining degradation in frequency characteristics in magnetooptical pits and the arrangement and the effect of a shielding plate.

The function of the shielding plate 1 shown in FIGS. 10(a) and 10(b) and 11 will be described below. First, an optical detection of a pit position will be considered. Recording pits of a magnetooptical disk are formed by arranging upward and downward domains. When linearly polarized light is radiated on upward and downward domains of the same size, the respective reflected light beams from these domains have the same total light quantity, and the linearly polarized light is rotated clockwise or counterclockwise depending on the direction of the domain. Suppose, for example, that an incident parallel light beam before an objective lens is linearly polarized light in the P-axis direction, such as the one shown in FIG. 2, and that the shape of a light quantity distribution parallel to tracks is as shown in FIG. 12. Referring to FIG. 12, the direction of an arrow T indicates the direction parallel to tracks, and a region between alternate long and short dashed lines indicates the size of the aperture of an objective lens. This light beam is radiated as a small light spot on a magnetooptical disk by the objective lens. The light reflected by the magnetooptical disk is again formed into a reflected parallel light beam through the objective lens. Similar to the case shown in FIG. 2, the linearly polarized light of the reflected parallel light beam is rotated counterclockwise to be $R_-$, with respect to the upward domain, and rotated clockwise to be $R_+$, with respect to the downward domain. In this case, light in the P-axis direction of the reflected parallel light beam is $P_+$ for both the domains, and the shape of the light quantity distribution is the same as that shown in FIG. 12. This shape remains substantially constant regardless of the size of a pit or the direction of a domain. Light in the S-axis direction, on the other hand, produced by rotation of the linearly polarized light becomes either $S_+$ or $S_-$ depending on the direction of the domain. If the sizes of the domains are the same, $S_+$ and $S_-$ have the same light quantity distribution, and their phase difference is $\pi$.

Figure 13:
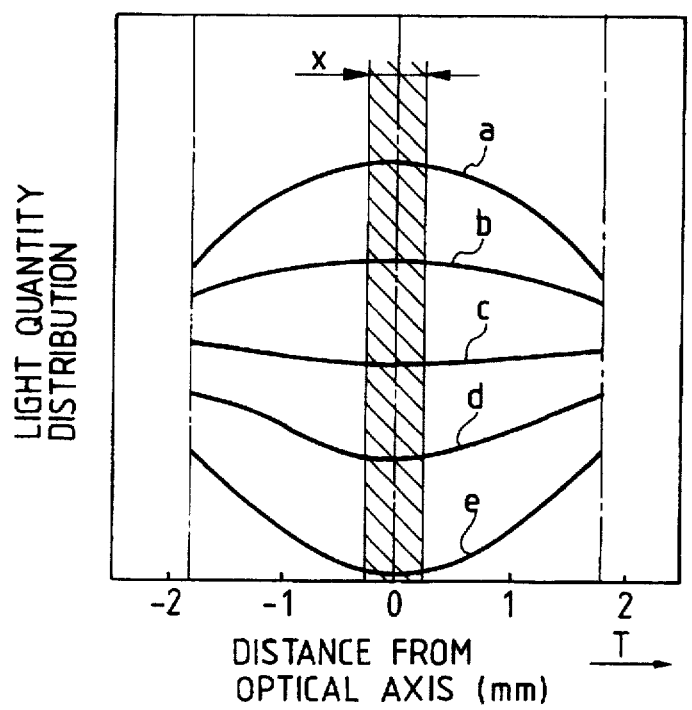
FIG. 13 is a graph for explaining degradation in frequency characteristics in magnetooptical pits and the arrangement and the effect of a shielding plate.

The behavior of the light quantity distribution of $S_+$ and $S_-$ will be described below with reference to FIG. 13. If the size of a pit is large enough that the pit is not adversely affected by adjacent pits, the shape of the light quantity distribution becomes the one indicated by a in FIG. 13, which is identical with that of $P_+$ shown in FIG. 12. The magnitude of the amplitude of a magnetooptical signal is determined by the degree of overlapping of the light quantity distribution of $P_+$ and that of $S_+$ and $S_-$. As the size of a pit approaches the size of a light spot, the light quantity distribution becomes small as a whole as indicated by b. The degree of this decrease in the central portion of the optical axis is larger than those at its peripheral portions. As the size of a pit decreases, the light quantity distribution also decreases more and more as indicated by c, d, and e. The light quantity distribution c corresponds to the size of a pit about half that of a light spot, and the light quantity distribution e corresponds to the size of a pit about ⅓ that of a light spot. As can be seen from FIG. 13, as the recording frequency increases in a magnetooptical pit, the light quantity in the S-axis direction, particularly the light quantity at the center of the optical axis decreases, and the signal amplitude also decreases. Therefore, when a band-like shielding plate (whose transmittance is optimally 0) is arranged in a direction perpendicular to the track direction (the direction T), as represented by a hatched portion in FIG. 13, the signal amplitudes for both low- and high-frequency recording pits decrease. Since, however, the decrease corresponding to the low-frequency side is larger, the relative frequency characteristics are improved.

Figure 3A:
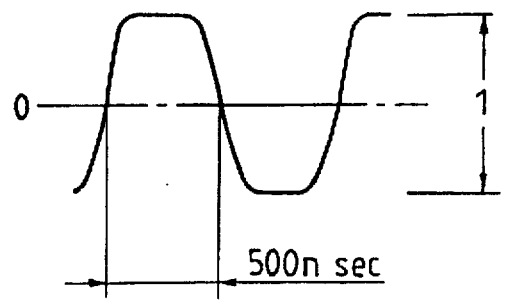
FIGS. 3A to 3D are views for explaining degradation in frequency characteristics and a relative improvement obtained by a shielding plate.
Figure 3B:
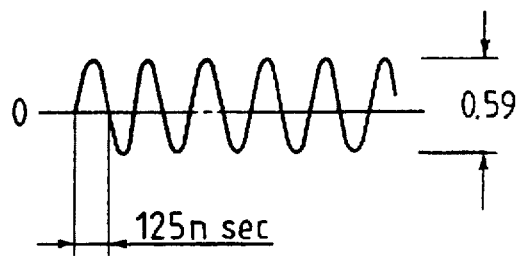
Figure 3C:
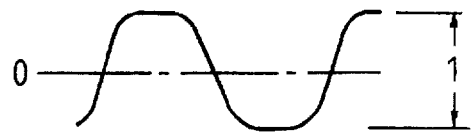
Figure 3D:
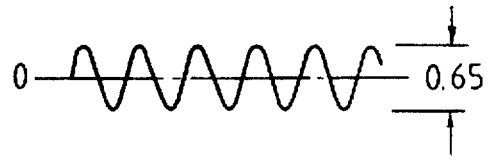
Figure 14:
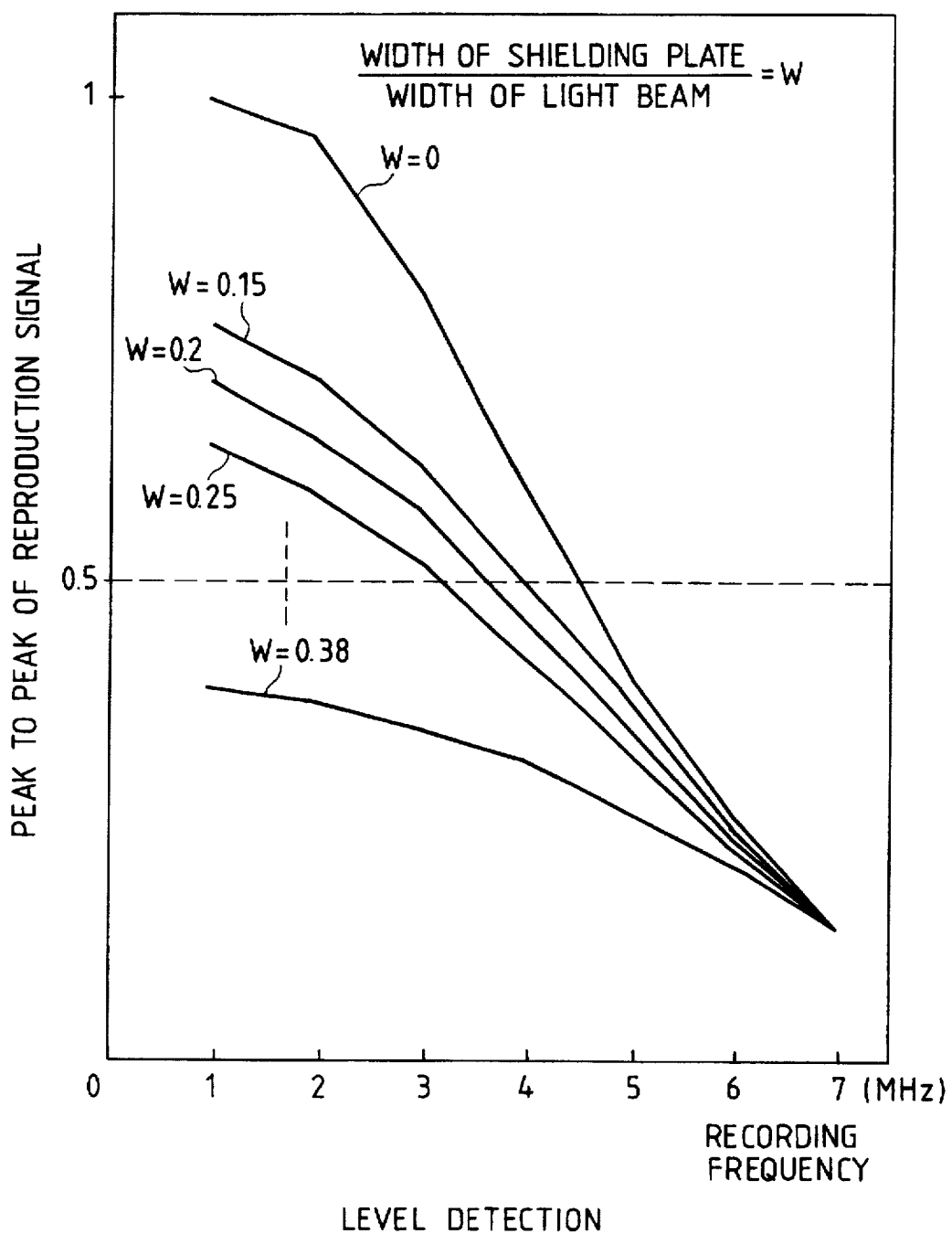
FIG. 14 is a graph showing the frequency characteristics of a method of optically detecting pit positions.

FIG. 14 is a graph showing the peak-to-peak magnitudes of signals obtained when signals with the single frequency are recorded and then reproduced. The size of a reproduction spot on a magnetooptical information recording medium is 1.7 μm, the rotating speed of the recording medium is 2,400 rpm, and the recording radius is 32 mm. In this figure, w is the ratio of a width x of the shielding plate to the width of a reflected parallel light beam. When the width x of the shielding plate is increased, the relative frequency characteristics are improved although the magnitude as a whole decreases, as compared with the case in which there is no shielding plate (w=0). For example, as already described above, the signals shown in FIGS. 3A and 3B are obtained at recording frequencies of 1 MHz and 4 MHz, respectively, under the same conditions when w=0. On the other hand, the signals shown in FIGS. 3C and 3D are obtained when w=0.25 at recording frequencies of 1 MHz and 4 MHz, respectively. Supposing the peak-to-peak value at 1 MHz is 1, the value at 4 MHz is about 0.59 when w=0, whereas it is about 0.65 when w=0.25, demonstrating that the frequency characteristics are improved. From FIG. 14, to obtain a value of 0.5 or more at 1 MHz assuming that the value at 1 MHz when w=0 is 1, w is preferably about 0.3 or less. If, however, photodetectors capable of weak light detection are used, it is clear that w with a larger value is more advantageous in improving the frequency characteristics.

In summary, in a magnetooptical information recording and reproducing apparatus for magnetoopotically recording information by radiating, via an optical head, laser light onto a magnetooptical information recording medium which records information pits by using the difference in the direction of magnetization, and applying a magnetic field to this irradiated portion, and/or optically reproducing the information by detecting light reflected by the irradiated portion by using photodetectors, a band-like shielding plate is arranged in an optical path of the reflected light from the magnetooptical recording medium in a direction perpendicular to tracks of the magnetooptical information recording medium, and the information is reproduced by detecting light beams not shielded by the shielding plate by using the photodetectors. The width of the shielding plate is desirably about 0.3 or less the diameter of the reflected light beam.

An optical detection of a pit edge will be considered next. In this case, a reproduction signal has a predetermined amplitude when a light spot exists on an edge and is 0 when the light spot exists on a pit. When the light spot is on an edge, the shape of the light quantity distribution of $P_+$ is identical with that shown in FIG. 12, but the light in the S-axis direction is split into two parts as indicated by e in FIG. 13. Note, in this case, that assuming one of the split light components is $S_+$, the other is $S_-$, and the phase difference between them is $\pi$. The phase relationship with respect to $P_+$ is as shown in FIG. 5. As the recording frequency rises, the light quantity decreases as a whole while the light is kept split into two parts, and the change in phase at the center of the optical axis becomes small. These two causes decrease the amplitude of the reproduction signal. Placing the shielding plate as described above makes it possible to remove the cause of a reduction on the high-frequency side resulting from the decrease in the change of phase at the center of the optical axis. Consequently, the relative frequency characteristics are improved.

Figure 15:
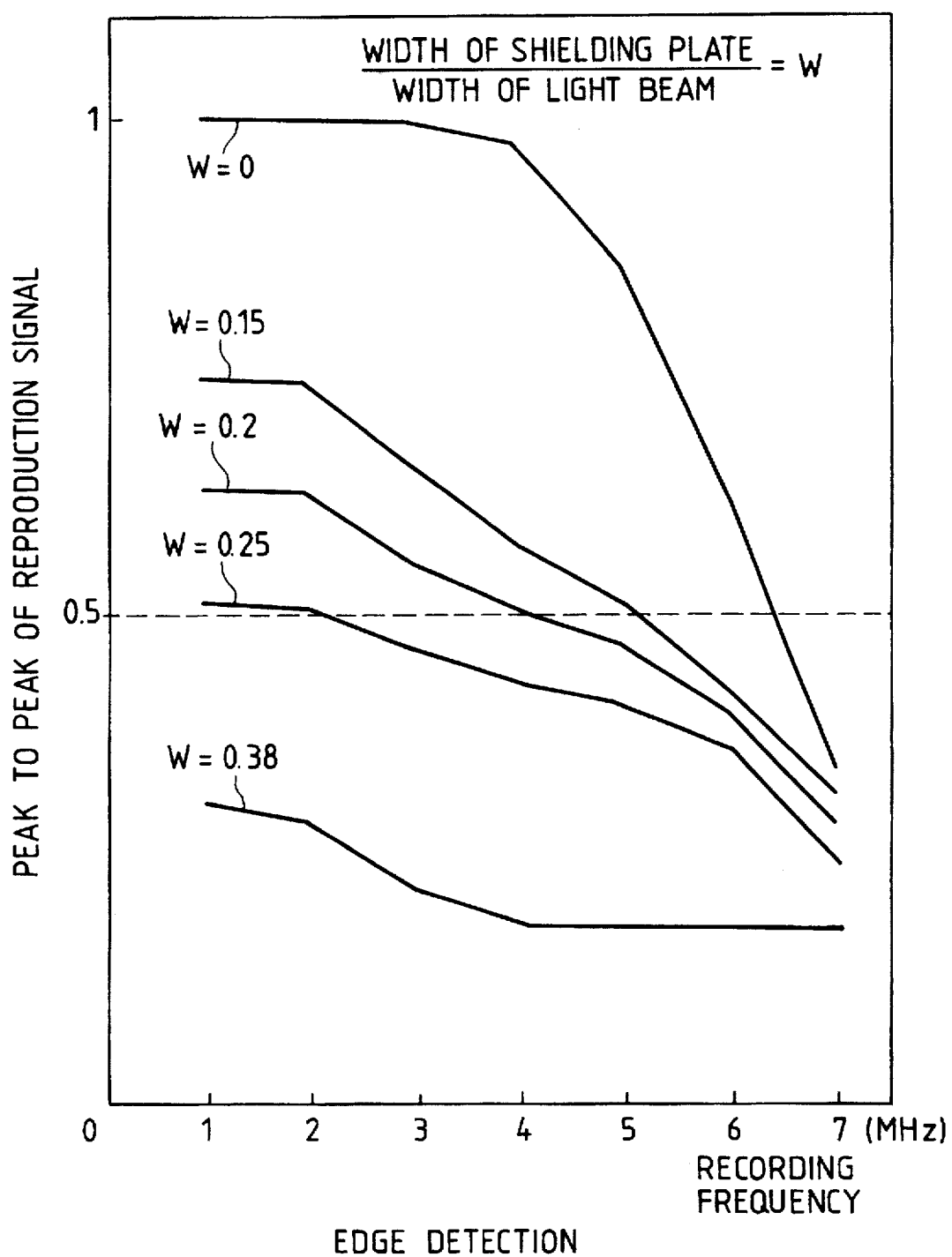
FIG. 15 is a graph showing the frequency characteristics of a method of optically detecting edges.

FIG. 15 shows the peak-to-peak magnitudes of signals recorded and subjected to optical pit edge detection under the same conditions as in FIG. 14. As compared with FIG. 14, degradation in the frequency characteristics is small up to around 4 MHz when there is no shielding plate (w=0). On the low-frequency side, therefore, an effect of removing noise components by removing the light of $P_+$ not overlapping the light in the S-axis direction is more significant than the effect of improving the frequency characteristics. On the high-frequency side exceeding 4 MHz, on the other hand, the effect of improving the frequency characteristics obtained by the shielding plate appears. To obtain a value of 0.5 or more at 1 MHz assuming that the value at 1 MHz is 1 when w=0 w is preferably 0.25 or less. If photodetectors capable of detecting weak light can be used, however, it is obviously desirable that w be further increased in order to improve the characteristics on the high-frequency side.

Figure 4A:
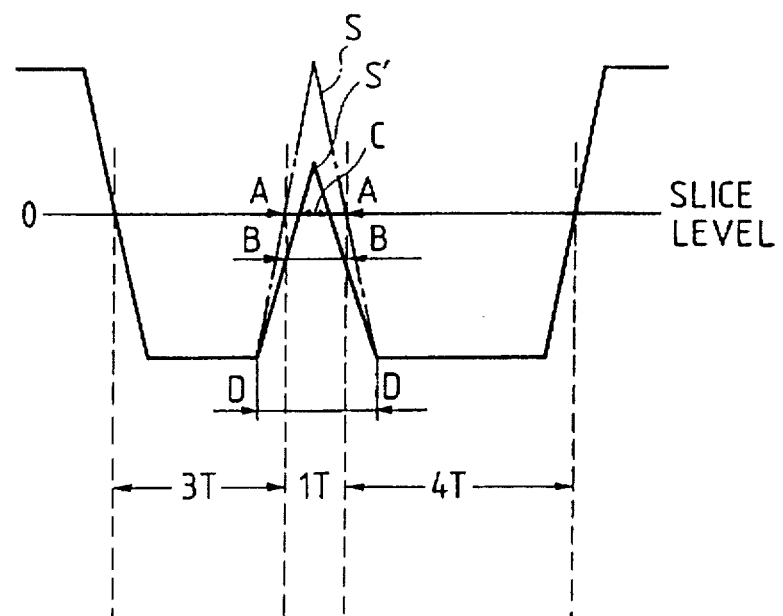
FIGS. 4(a) and (b) are views for explaining the influence of degradation in frequency characteristics in random signals.
Figure 4B:
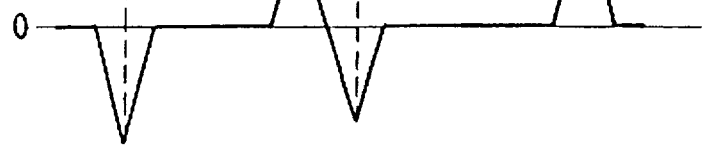
Figure 16:
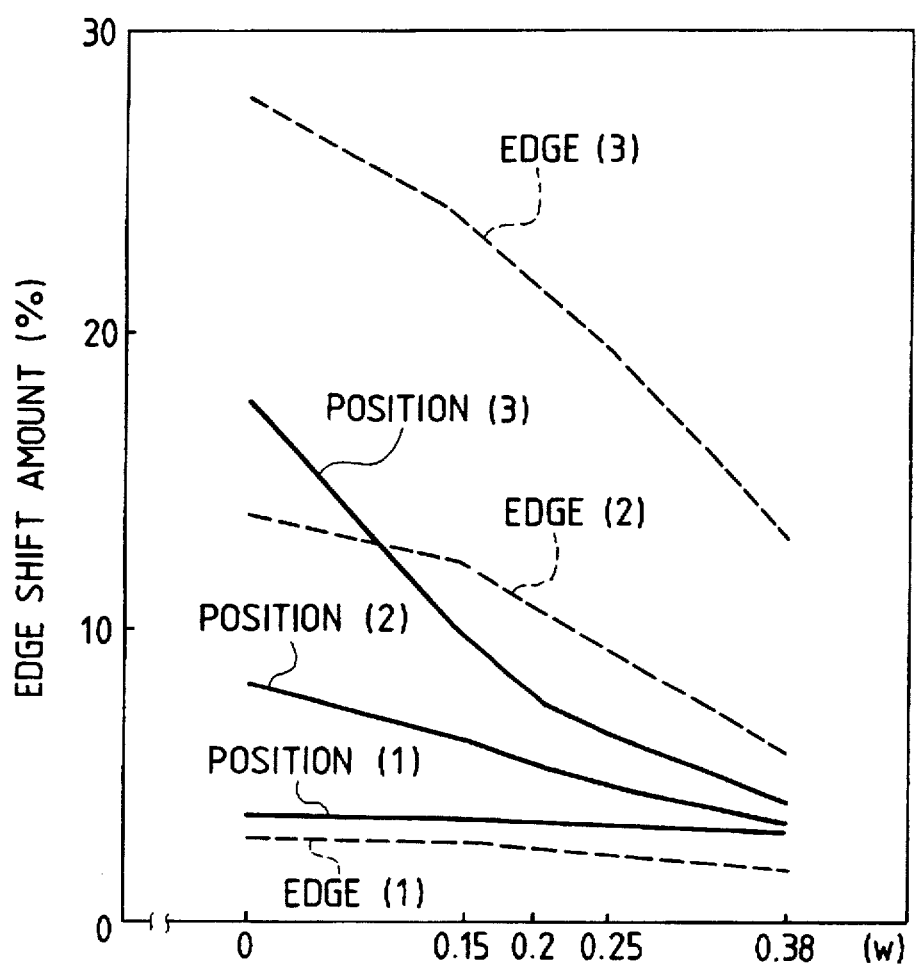
FIG. 16 is a graph for explaining an edge shift amount.

The edge shift amounts of detection signals with respect to random signals already mentioned earlier with reference to FIGS. 4 and 9 and the effect of the shielding plate will be explained below. FIG. 16 is a graph showing the shift amounts of the detected positions of edges of signals with durations 3T, 1T, and 4T from the respective original lengths of 3T, 1T, and 4T, with respect to the length of 1T, when the signals with the durations 3T, 1T, and 4T are sequentially, repeatedly recorded as random signals. Referring to FIG. 16, a position (1) and an edge (1) indicate edge shift amounts detected in recording when 1T is 125 nsec, a position (2) and an edge (2) indicate edge shift amounts detected in recording when 1T is 100 nsec, and a position (3) and an edge (3) indicate edge shift amounts detected in recording when 1T is 83 nsec. The other conditions are the same as described above. Each of the positions (1), (2), and (3) represents the result of detection of an edge at a position where a signal, which is obtained by optically detecting a pit position, traverses a predetermined slice level, as indicated in FIG. 4(a). Each of the edges (1), (2), and (3) represents the result of detection of an edge at the position of the peak of a signal obtained by optically detecting the pit edge.

Figure 9A:
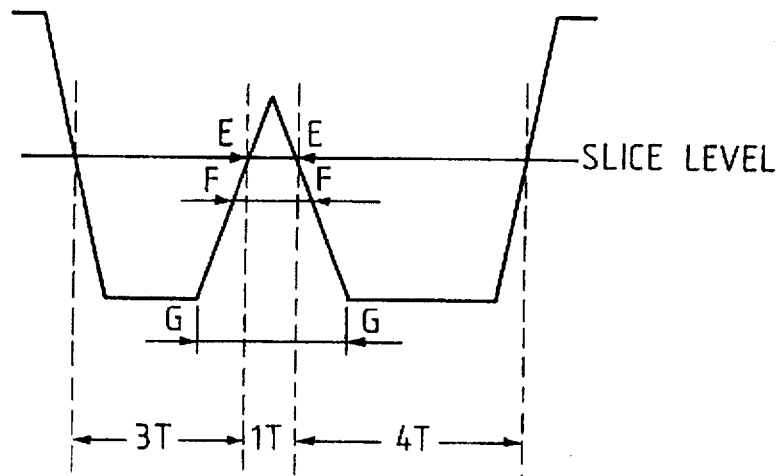
FIGS. 9(a) and 9(b) are views for explaining the influence of intersymbol interference in random signals.
Figure 9B:
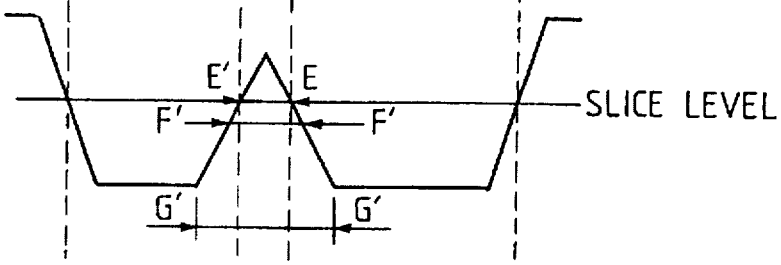

More specifically, when the length of 1T is 125 nsec (the domain length is approximately 1.00 µm), the position (1) and the edge (1) are almost equal. In this case, the edge shift amount improving effect of the shielding plate is insignificant. When the length of 1T is 100 nsec (the domain length is about 0.80 µm), the edge shift amount of the position (2) is smaller than that of the edge (2). This is so because the width of G shown in FIG. 9(a) becomes larger than its original width under the influence of intersymbol interference. For this reason, in the method of optically detecting pit edges, the width of 1T becomes larger than its original width (the widths of 3T and 4T become smaller), since the position indicated by F in FIG. 9(a) is detected. In the method of optically detecting the positions of pits, however, the width at the position indicated by E in FIG. 9(a) is detected, and, if the domain length becomes about half or less the size of a light spot, the width at the position E becomes smaller than the original width of 1T because the amplitude decreases due to the degradation of the frequency characteristics. This effect cancels the effect of width increase by intersymbol interference, suppressing the edge shift amount. When the shielding plate is arranged, the relative frequency characteristics are further improved as shown in FIG. 9(b), and the width G becomes G' (<G), i.e., approaches the original width. As a result, the widths E and F become E' (>E) and F' (<F), respectively, approaching the original width of 1T. This demonstrates that the effect of the shielding plate appears for both the position (2) and the edge (2). That is, it is preferable that the shielding plate be arranged and the minimum length of information pits recorded on a magnetooptical information recording medium in the direction of tracks be set to about half or less the diameter of a light spot used when reproduction of information is performed.

When the length of 1T is 83 nsec (the domain length is about 0.67 µm), the edge shift amounts of both the position (3) and the edge (3) exceed 10%, indicating the effect of the shielding plate. The edge shift amount can be reduced to 10% or less at the position (3) by placing the shielding plate. When there is no shielding plate, the edge shift amount of the position (3) increases abruptly because the degradation in the frequency characteristics increases to increase the amplitude of 1T to a magnitude almost traversing the slice level. For domain lengths smaller than this length, the width of 1T can no longer be read by the method in which a pit position is optically detected and the edge of the pit is detected at a position where the reproduction signal traverses a predetermined slice level. The method of optically detecting a pit edge, on the other hand, can read the width of 1T even for domain lengths smaller than the above length. However, the edge shift amount is increased even if the shielding plate is placed. The edge shift amount of the position (3) is suppressed to be smaller than that of the edge (3) for the same reason as mentioned earlier for the position (2).

As described above, when the domain length of 1T is larger than a half size of a light spot, the edge shift amount can be relatively suppressed to be small by both the method of optically detecting pit positions and the method of optically detecting pit edges. In this case, the shielding plate has the effect of improving the relative frequency characteristics, for the method of optically detecting pit positions, and the effect of reducing noise components, for the method of optically detecting pit edges.

When the domain length of 1T ranges between about ½ and about ⅔ the diameter of a light spot, since the influence of degradation in the frequency characteristics and the influence of intersymbol interference cancel each other out in the method of optically detecting pit positions, the edge shift amount can be decreased to be smaller than in the method of optically detecting pit edges. In addition, in the method of optically detecting pit edges, the influence of intersymbol interference is enhanced, and consequently the width of 1T is detected to be larger than its original width. The shielding plate, therefore, has the effect of reducing the intercode interference, in addition to the above effects, thereby decreasing the edge shift amounts in both the methods.

When the domain length of 1T is about ⅖ or less the diameter of a light spot, the amplitude of 1T does not traverse the slice level any longer in the method of optically detecting pit positions, resulting in read errors. In the method of optically detecting pit edges, on the other hand, the edge shift amount increases although reading can be performed. (Both the methods require another correction).

To sum up, in a magnetooptical information recording and reproducing apparatus for magnetoopotically edge-recording information by radiating, via an optical head, laser light onto a magnetooptical information recording medium, which records information pits by using the difference in the direction of magnetization, and in which the significance of information is given to the boundary of each information pit, and applying a magnetic field to this irradiated portion, and/or edge-reproducing the information by optically detecting the positions of the information pits from reflected light by using photodetectors, and detecting the boundary of each information pit from a position at which the detection signal traverses a predetermined value, the minimum length of the information pits recorded on the magnetooptical information recording medium in the direction of the tracks is set to about ½ to about ⅔ the diameter of a light spot formed during reproduction.

Figure 17:
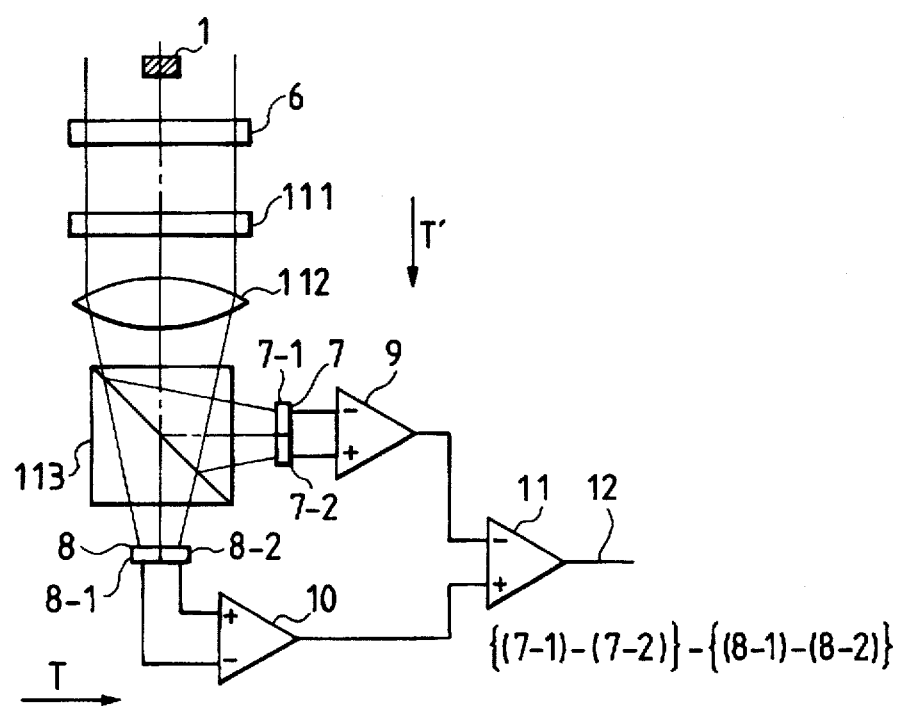
FIG. 17 is a view showing another reproducing optical system according to the present invention.
Figures 18A, 18B:
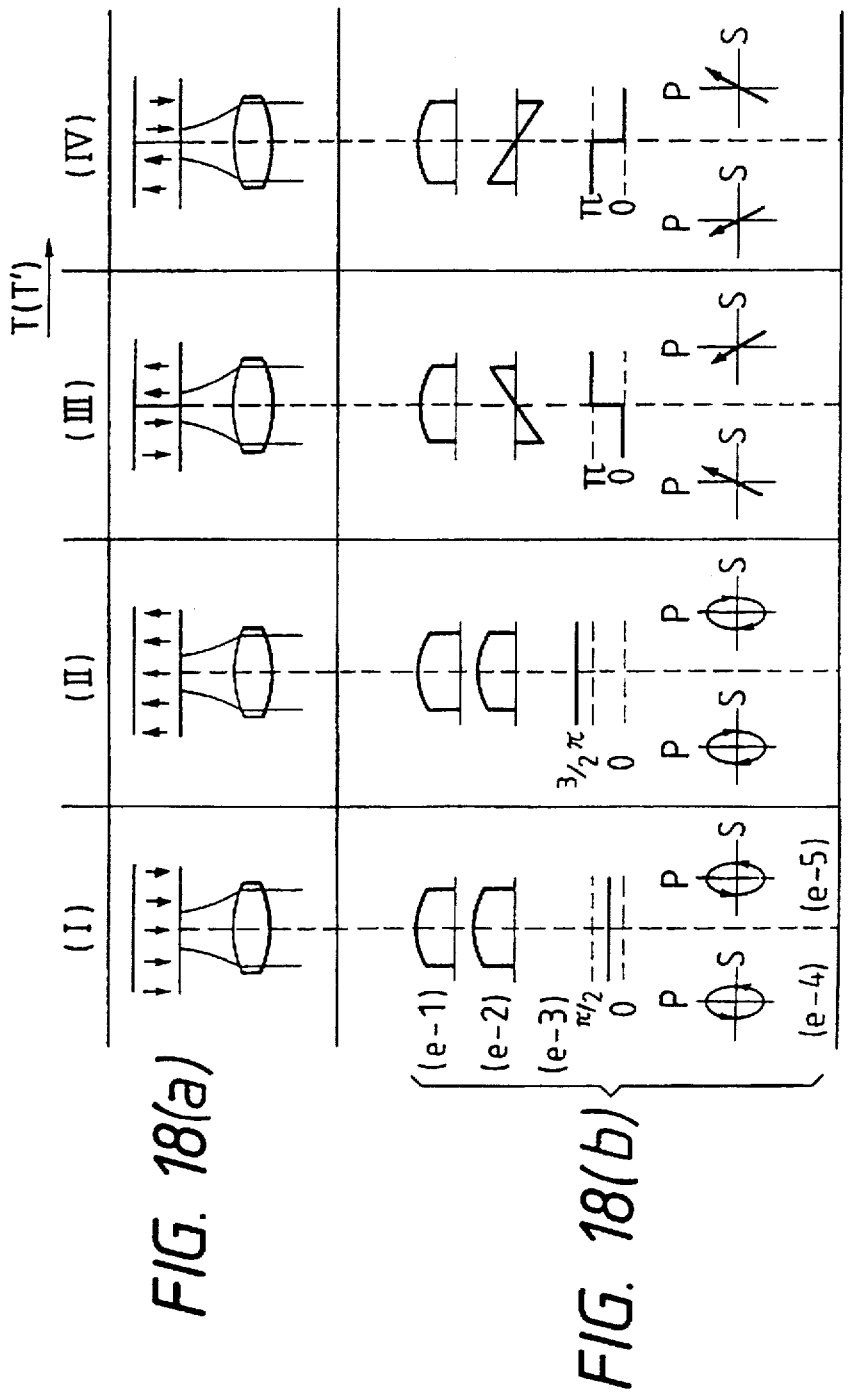
FIGS. 18(a), 18(b) and 18(c) are views for explaining the reproducing optical system shown in FIG. 17.
Figure 18C:
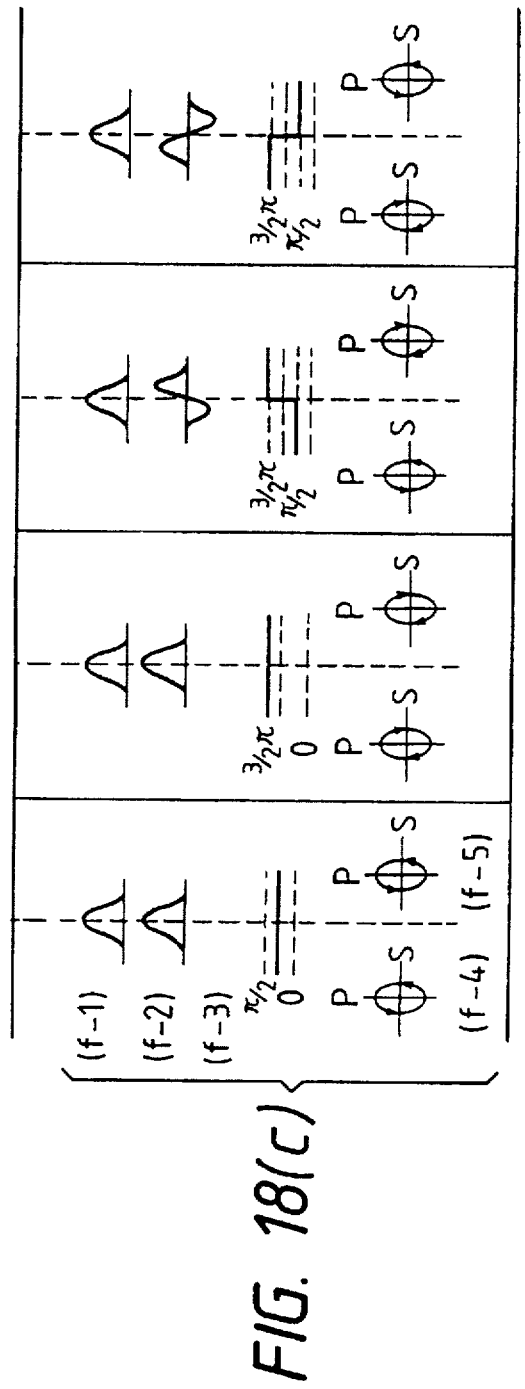

FIG. 17 shows still another embodiment of the system for optically detecting pit edges similar to that shown in FIG. 11. Referring to FIG. 17, a shielding plate 1 has the same function as described above, and a halfwave plate 111, a condenser lens 112, and a polarizing beam splitter 113 are identical with those of the conventional example shown in FIG. 1. The fast axis (the axis along which a phase advances relatively) or the slow axis (the axis along which a phase delays relatively) of a quarter-wave plate 6 is matched with the direction of incident linearly polarized light. That is, the phase of the s-polarized light is advanced or delayed by $\pi/2$ with respect to the p-polarized light. The function of the quarter-wave plate 6 will be described below with reference to FIGS. 18(a) through 18(c) and 5(a) through 5(d) FIGS. 18(a) through 18(c) show the amplitude distributions, the phase distributions, and the polarized light distributions of reflected light beams of linearly polarized light in the direction of the p-polarized light incident on a magnetooptical medium, which are measured on the far field plane after the light beams pass through the quarter-wave plate 6 and at the convergent position of the condenser lens 112. Note that the influences of the shielding plate 1, the halfwave plate 111, and the polarizing beam splitter 113 as an analyzer are not illustrated in FIGS. 18(a) through 18(c). In these figures, T (T') represents the scanning direction of a light spot which is in a direction parallel to the tracks. FIG. 18(a) indicates the reproduction position of a light spot formed by an objective lens, like FIG. 5(a). FIG. 18(b) shows the distributions of the reflected light beams in states [I] to [IV] on the far field plane after the light beams pass through the quarter-wave plate 6. FIG. 18(c) illustrates the distributions at the convergent position of the condenser lens 112. More specifically, (e-1) and (f-1) represent the amplitude distributions of the p-polarized light; (e-2) and (f-2), the amplitude distributions (their magnitudes are ignored) of the s-polarized light; (e-3) and (f-3), the phase distributions of the s-polarized light with respect to the p-polarized light; (e-4) and (f-4), the polarized states on the left side of the light beam; and (e-5) and (f-5), the polarized states on the right side of the light beam. The distribution at a position where the reflected light beam emerges from a magnetooptical medium and the distribution on the far field plane before the light beam is incident on the quarter-wave plate 6 are identical with those shown in FIGS. 5(b) and 5(c).

Figures 5A, 5B:
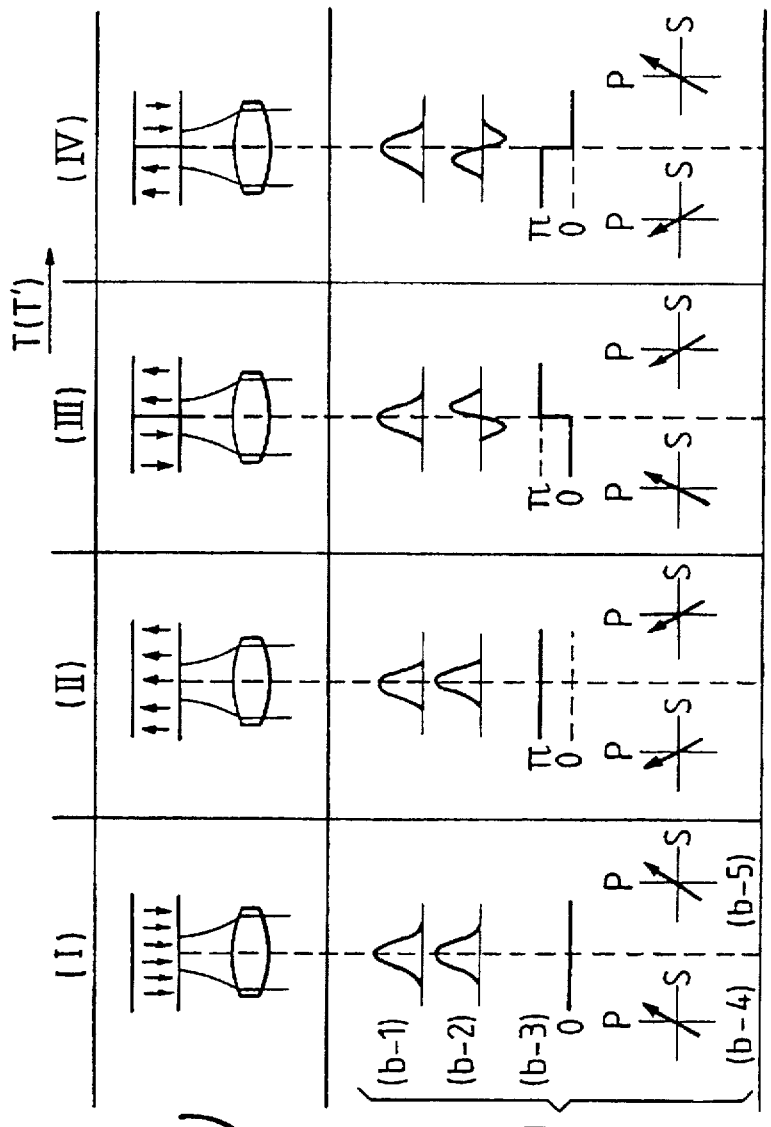
FIGS. 5(a) through 5(b) are views for explaining a conventional pit edge detection method.

FIGS. 18(a) and 5(a) indicate, (a) indicates the reproduction position of a light spot formed by the objective lens. [I] indicates a state in which downward magnetization is reproduced; [II], a state in which upward magnetization is reproduced; [III], a state in which magnetization is downward on the left side of an edge portion of a pit; and [IV], a state in which magnetization is upward on the left side of an edge portion of a pit.

In the case [I] of downward magnetization, the p-polarized light and the s-polarized light at the position FIG. 5(b) where the light beam emerges from the magnetooptical information recording medium have the same amplitude distribution symmetrical about the optical axis. The polarized light distribution is also symmetrical, and the polarized light is linearly polarized light ($R_+$) which is rotated clockwise shown in FIG. 2. At this point, the phase difference between the p-polarized light and the s-polarized light is 0. On the far field plane of FIG. 5(c) before the light beam is incident on the quarter-wave plate 6, the amplitude distribution of each of the p-polarized light and the s-polarized light is symmetrical about the optical axis, the phase of the s-polarized light remains 0, and the polarized states on the right and the left sides remain unchanged. In FIG. 18(b) after the light beam passes through the quarter-wave plate 6, the phase of the s-polarized light advances or delays by $\pi/2$ relative to the position of the p-polarized light, because the fast axis or the slow axis of the quarter-wave plate 6 is matched with the direction of the p-polarized light. Assuming that the quarter-wave plate 6 is so arranged as to advance the phase by $\pi/2$, the amplitude distributions of the p-polarized light and the s-polarized light remain the same, but the phase of the s-polarized light changes to $\pi/2$ as indicated by (e-3). Since the s-polarized light has produced a phase difference of $\pi/2$ with respect to the p-polarized light, the polarized light becomes elliptically polarized light. Assume, as indicated by (e-4) and (e-5), that this elliptically polarized light is left-handed and has its major axis in the direction of the p-polarized light. At the convergent position shown in FIG. 18(c) of the condenser lens 112, the amplitude distribution of each of the p-polarized light and the s-polarized light is symmetrical about the optical axis, and the phase and the polarized state of the s-polarized light remain unchanged from those shown in FIG. 18(b).

In the case [II] of upward magnetization, the amplitude distributions of the p-polarized light and the s-polarized light are identical with those in the case [I], so a detailed description thereof will be omitted. At the position of FIG. 5(b) where the light beam emerges from the magnetooptical information recording medium, the phase of the s-polarized light is $\pi$, and the linearly polarized light ($R_-$) which is rotated counterclockwise shown in FIG. 2 appears on both the right and the left sides in the polarized light distribution. On the far field plane of FIG. 5(c) before the light beam is incident on the quarter-wave plate 6, the phase and the polarized state of the s-polarized light remain the same. At the position of FIG. 18(b) after the light beam passes through the quarter-wave plate 6, the phase of the s-polarized light advances by $\pi/2$ to change to $3/2\ \pi$ as indicated by (e-3), resulting in right-handed elliptically polarized light on both the right and the left sides in the polarized light distribution. At the convergent position of FIG. 18(c) of the condenser lens 112, the state remains unchanged from that of FIG. 18(b).

In the case [III] in which magnetization is downward on the left side of the pit edge, at the position of FIG. 5(b) at which the light beam emerges from the magnetooptical information recording medium, the amplitude distribution of the p-polarized light is symmetrical about the optical axis as in the cases [I] and [II]. The amplitude distribution of the s-polarized light, however, is split into two parts, and the phase is 0 on the left side and $\pi$ on the right side in the phase distribution. The polarized light at this time is linearly polarized light ($R_+$) which is rotated clockwise, on the left side, and linearly polarized light ($R_-$) which is rotated counterclockwise, on the right side. On the far field plane of FIG. 5(c) before the light beam is incident on the quarter-wave plate 6, the amplitude distribution of the p-polarized light is still symmetrical, and the amplitude distribution of the s-polarized light remains split into two parts. However, a change occurs in the phase distribution of the s-polarized light; the phase changes to $-\pi/2$ on the left side and $+\pi/2$ on the right side. This changes the polarized light to right-handed elliptically polarized light, on the left side, and left-handed elliptically polarized light, on the right side. These elliptically polarized light components have the same ellipticity and the same magnitude, and their major axes are in the direction of the p-polarized light. At the position of FIG. 18(c) after the light beam passes through the quarter-wave plate 6, the phase advances by $\pi/2$ to be 0 on the left side and $\pi$ on the right side. Although the amplitude distribution remains the same, the polarized light changes to linearly polarized light ($R_+$) which is rotated clockwise, on the left side, and linearly polarized light ($R_-$) which is rotated counterclockwise, on the right side. When the light beam further propagates to the convergent position of FIG. 18(c), the amplitude distribution of the p-polarized light remains symmetrical, and the amplitude distribution of the s-polarized light remains split into two parts, but the phase of the s-polarized light changes to $\pi/2$ on the left side and $3/2\,\pi$ on the right side. In addition, the polarized light becomes left-handed elliptically polarized light, on the left side, and right-handed elliptically polarized light, on the right side. In the case [IV] in which magnetization is upward on the left side of the pit edge, the individual states are the reverse in the right-and-left direction of the corresponding states in the case [III].

Figure 2:
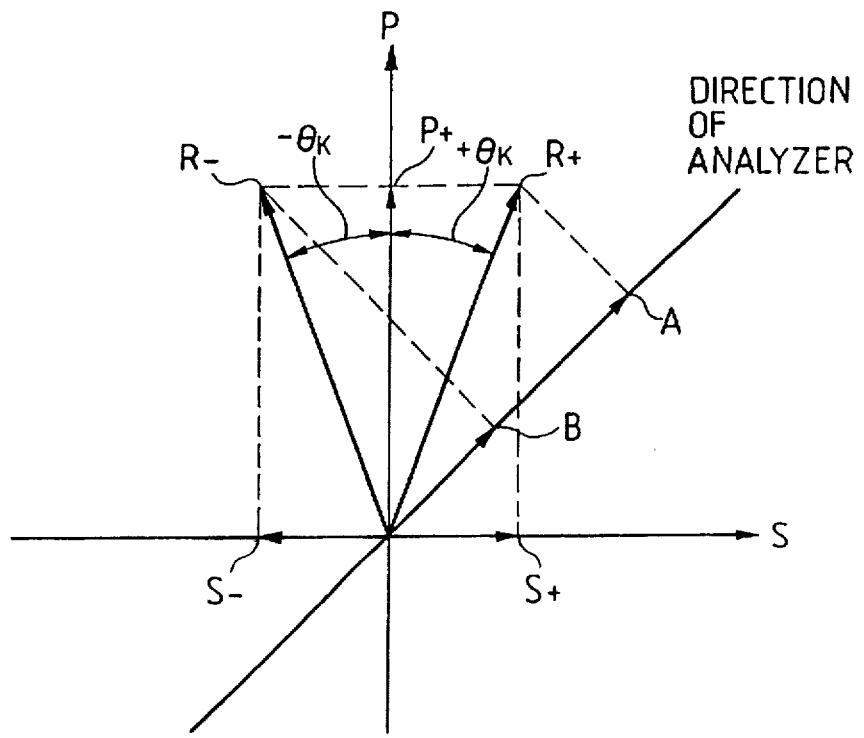
FIG. 2 is a view for explaining the reproduction principle of the conventional example shown in FIG. 1.

Since the light beam passes through the halfwave plate 111 and the polarizing beam splitter 113 as an analyzer, the difference between the two linearly polarized light components $R_+$ and $R_-$ can be detected as a light quantity difference as shown in FIG. 2. It is, however, not possible to detect the difference between the two, right- and left-handed elliptically polarized light components. That is, a position signal of a pit can be obtained only on the far field plane ((c) in FIG. 5) or at the convergent position ((d) in FIG. 5) when there is no quarter-wave plate 6. An edge position of a pit, on the other hand, can be obtained only at the convergent position ((d) in FIG. 5) when there is no quarter-wave plate 6 or on the far field plane ((b) in FIG. 18) when the quarter-wave plate 6 is placed. In other words, to obtain both the pit position signal and the pit edge signal, a multisegment photodetector need only be arranged at the convergent position of the condenser lens 112 without placing the quarter-wave plate 6, as shown in FIG. 11. To obtain only the pit edge signal, however, the quarter-wave plate 6 is placed, and a multisegment photodetector is arranged on the far field plane after the quarter-wave plate 6. Consequently, a signal equivalent to the that described above can be obtained.

In the arrangement shown in FIG. 17, two-segment photodetectors 7 and 8 are arranged closer to the condenser lens 112 than to the convergent position of the condenser lens 112. Therefore, this reproducing optical system is shorter than the optical head shown in FIG. 11, and this makes miniaturization of the apparatus possible (the distribution obtained at this position is that shown in (b) of FIG. 18). The division lines of these two-segment photodetectors are in directions perpendicular to the directions T and T' parallel to tracks. Therefore, assuming that signals obtained by the light-receiving surfaces of the individual constituent photodetectors of these two-segment photodetectors are (7-1), (7-2), (8-1), and (8-2), a pit edge signal 12 can be obtained by differential amplifiers 9, 10, and 11.

Figure 19:
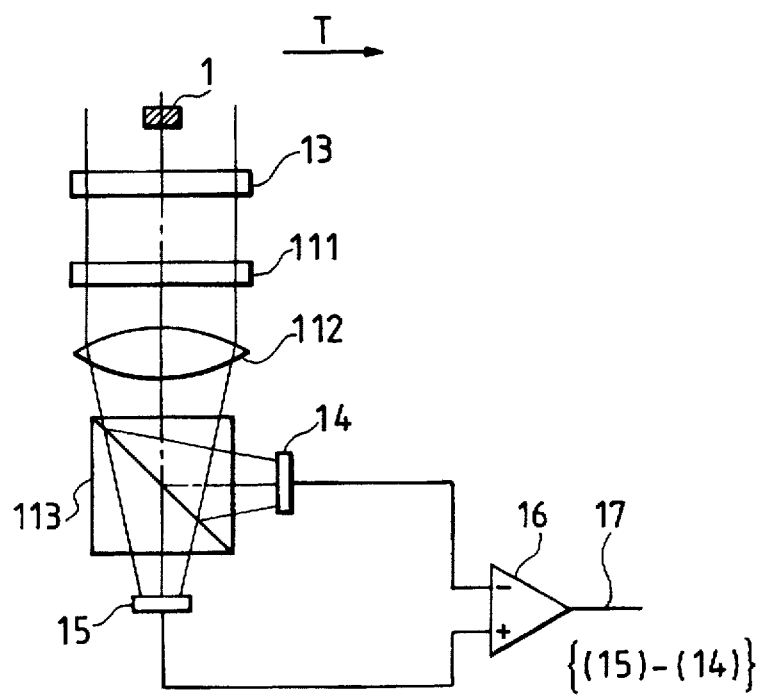
FIG. 19 is a view showing still another reproducing optical system according to the present invention.

FIG. 19 shows still another embodiment of the system for optically detecting pit edges. Referring to FIG. 19, a shielding plate 1 functions in the same manner as described above, and a halfwave plate 111, a condenser lens 112, and a polarizing beam splitter 113 are identical with those of the conventional example shown in FIG. 1. A quarter-wave plate 13 has two regions before (the right side in FIG. 19) and behind (the left side in FIG. 19) a light beam with respect to a direction (indicated by an arrow T) parallel to tracks. In one region, the fast axis of the quarter-wave plate coincides with the direction of incident linearly polarized light. In the other region, the slow axis of the quarter-wave plate agrees with the direction of incident linearly polarized light. Suppose, in this embodiment, that the incident linearly polarized light is linearly polarized light (p-polarized light) in the P-axis direction, such as the one explained in FIG. 2. The quarter-wave plate 13 having the two regions is arranged such that the phase of the s-polarized light is advanced by a quarter wave ($1/2\,\pi$) with respect to the p-polarized light of a light beam on the right side, and delayed by a quarter wave ($1/2\,\pi$) with respect to the p-polarized light of a light beam on the left side.

Figures 5C, 5D:
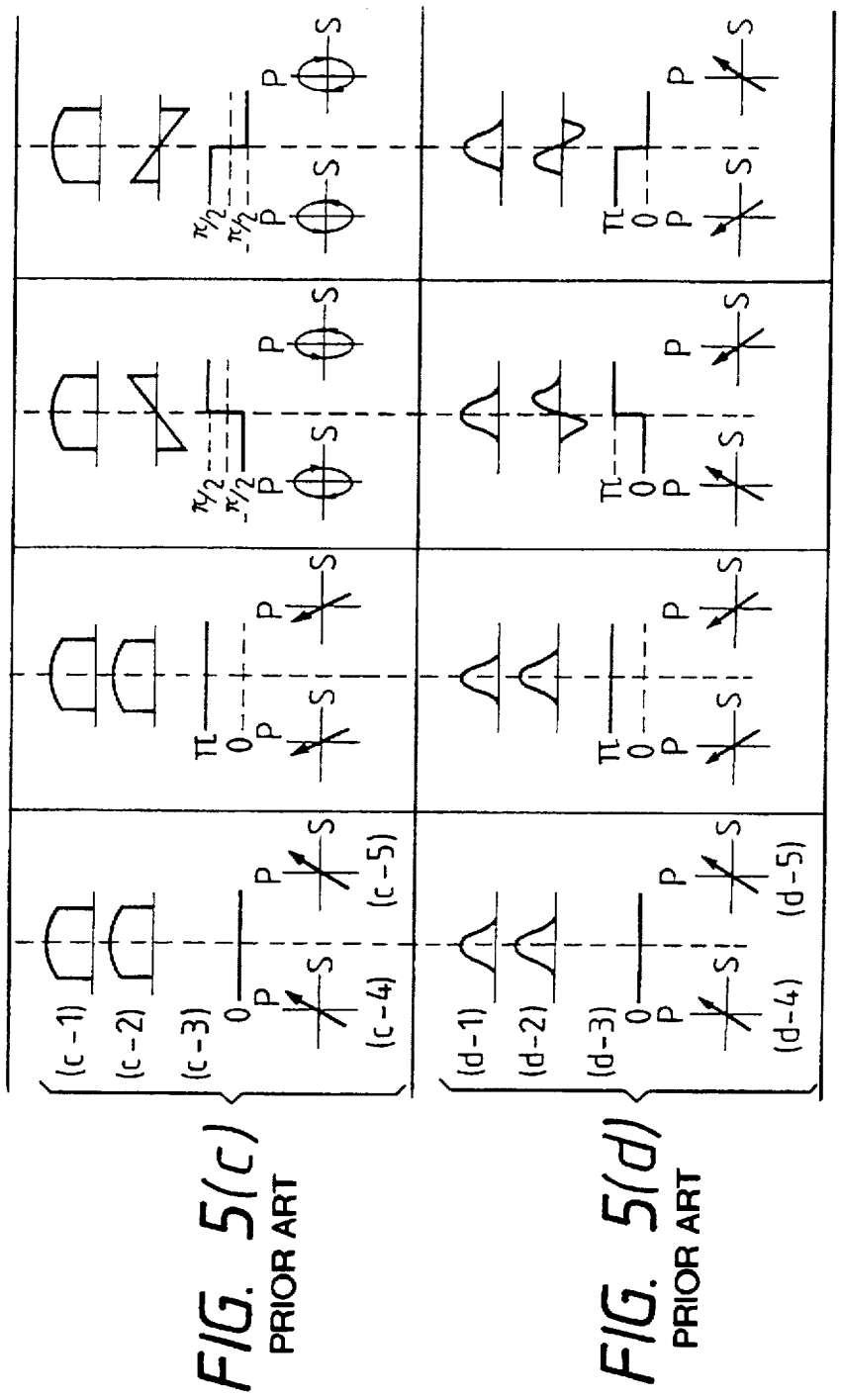
Figures 20A, 20B:
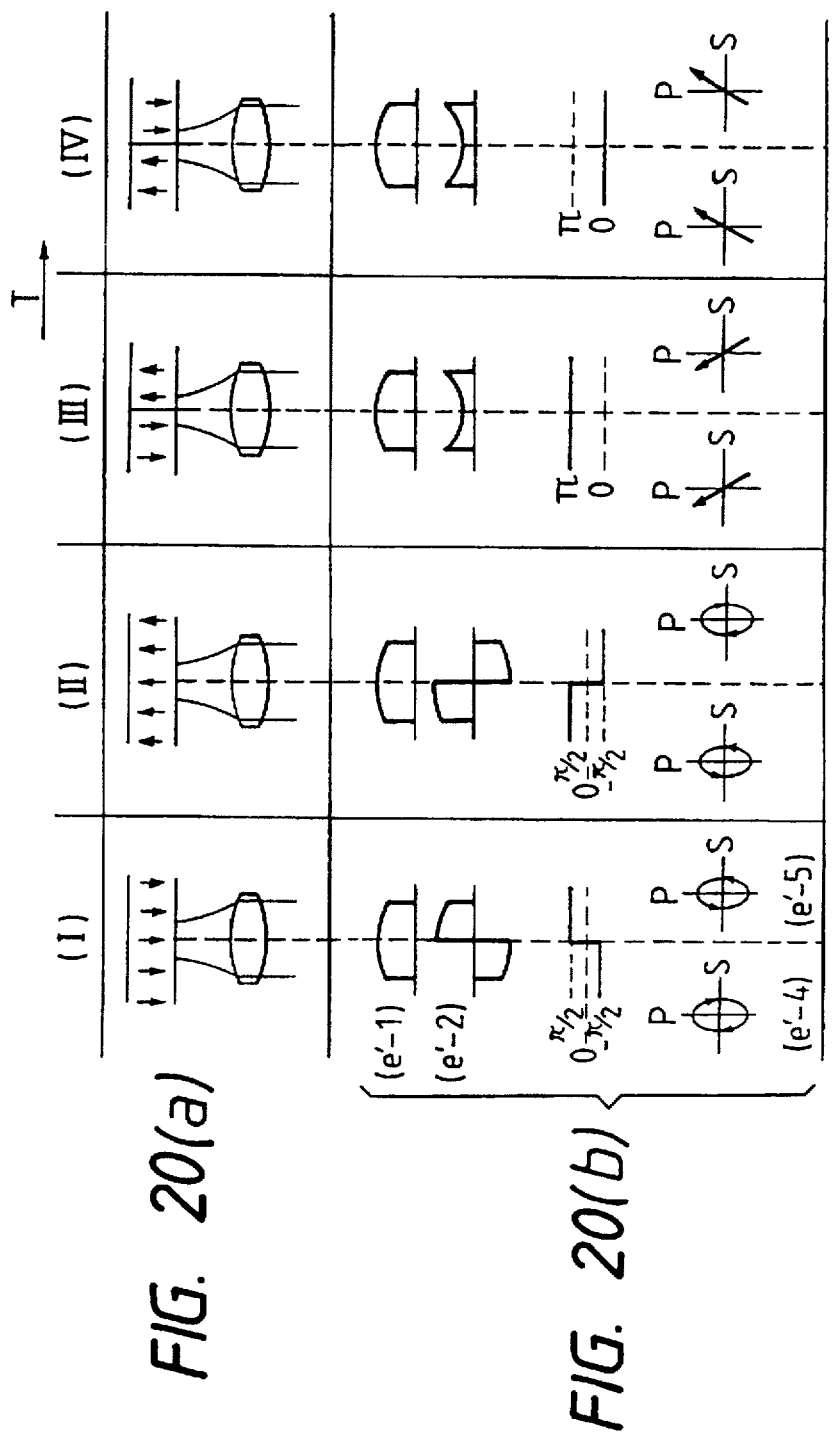
FIGS. 20(a), 20(b) and 20(c) are views for explaining the reproducing optical system shown in FIG. 19.
Figure 20C:
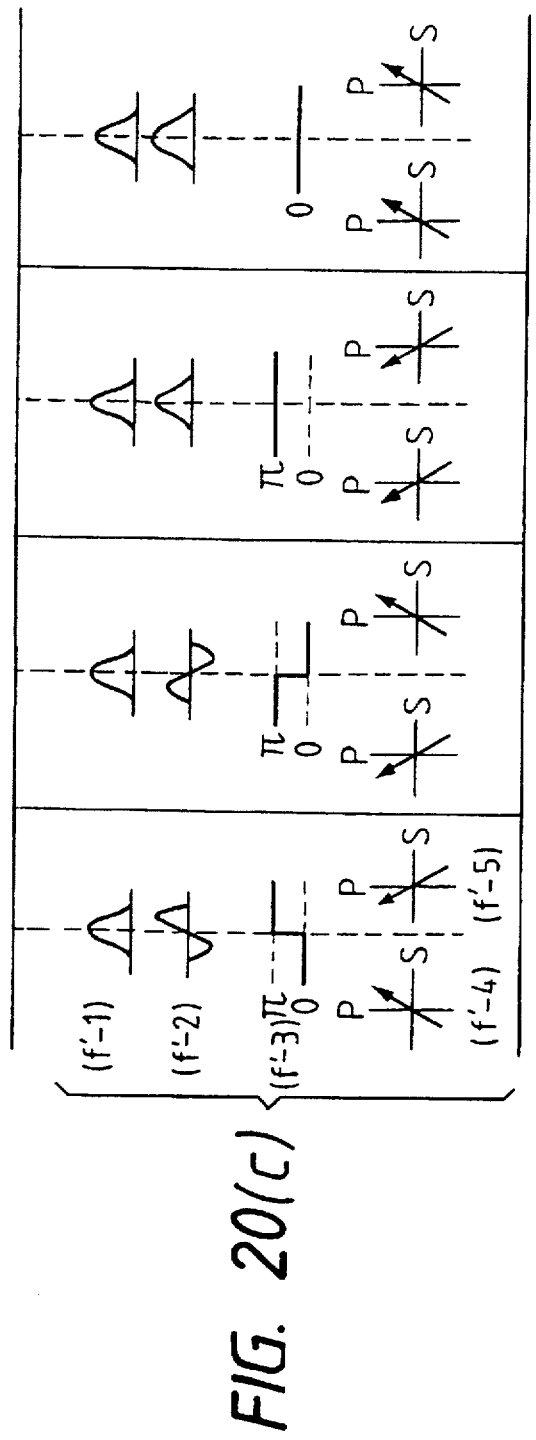

FIGS. 20(a) through 20(c) show the states of light beams passing through the quarter-wave plate 13 having the two regions. In the same cases [I] to [IV] as those explained in FIGS. 5(a) through 5(d), the states of reflected light beams from a magnetooptical information recording medium, which are obtained on the far field plane (c) shown in FIG. 5, are converted into those indicated by FIG. 20(b) because the light beams pass through the quarter-wave plate 13. FIG. 20(c) illustrates the states on the convergent plane of the condenser lens 112 (note that the influences of the shielding plate 1, the halfwave plate 111, and the polarizing beam splitter 113 are not taken into consideration). As in FIGS. 5(a) through 5(d), (e'-1) and (f'-1) represent the amplitude distributions of the p-polarized light; (e'-2) and (f'-2), the amplitude distributions of the s-polarized light (their magnitudes are ignored); (e'-3) and (f'-3), the phase distributions of the s-polarized light with reference to the p-polarized light; (e'-4) and (f'-4), the polarized states on the left side of the light beam; and (e'-5) and (f'-5), the polarized states on the right side of the light beam.

Focusing attention on the state (e') after the light beams pass through the quarter-wave plate 13, in the case [I] of downward magnetization, linearly polarized light ($R_+$) which is rotated clockwise is converted into right-handed elliptically polarized light, on the left side, and left-handed elliptically polarized light, on the right side. In the case [II] of upward magnetization, in contrast, linearly polarized light ($R_-$) which is rotated counterclockwise is converted into left-handed elliptically polarized light on the left side, and right-handed elliptically polarized light, on the right side. In the case [III] in which an edge from downward magnetization to upward magnetization appears, right-handed elliptically polarized light and left-handed elliptically polarized light on the left and the right sides, respectively, are converted into linearly polarized light ($R_-$) which is rotated counterclockwise. In the case [IV] in which an edge from upward magnetization to downward magnetization appears, left-handed elliptically polarized light and right-handed elliptically polarized light on the left and the right sides, respectively, are converted into linearly polarized light ($R_+$) which is rotated clockwise.

When these light beams reach the convergent plane of the condenser lens 112, in the case [I] or [II] of downward magnetization or upward magnetization, the left and the right polarized states change from different elliptically polarized light components to different linearly polarized light components ($R_+$ and $R_-$). In the cases [III] and [IV] in each of which an edge appears, the left and the right polarized states remain unchanged from those in FIG. 20(b), the same linearly polarized light.

Figures 8A, 8B:
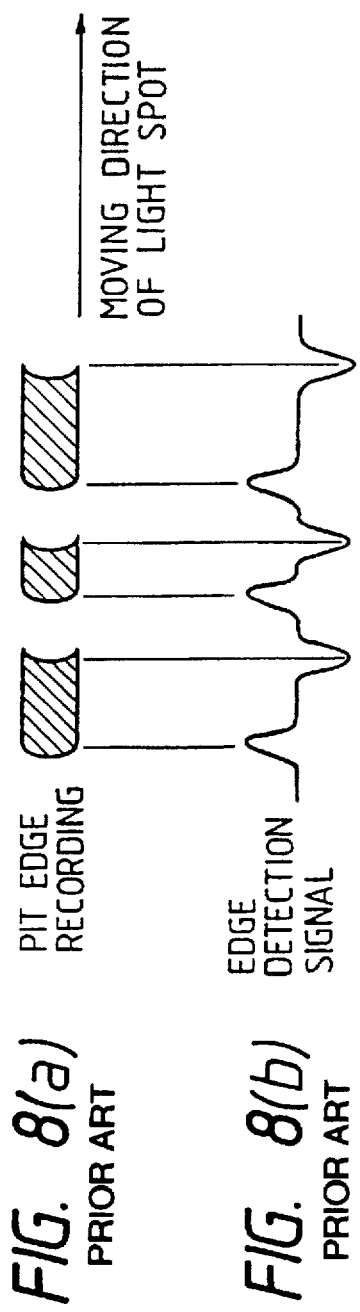
FIGS. 8(a) and 8(b) are views showing the waveform of a pit edge detection signal.

Referring back to FIG. 19, the halfwave plate 111, the condenser lens 112, and the polarizing beam splitter 113 have the same functions as explained in FIG. 1. Photodetectors 14 and 15 may be arranged either on the convergent plane of the condenser lens or in the middle of the path to the convergent plane. In the cases [I] and [II] in each of which the left and the right polarized states of the light beam are different to cancel each other out, identical detection signals are obtained from the photodetectors 14 and 15, so an edge detection signal 17 from a differential amplifier 16 becomes 0. In the cases [III] and [IV] in each of which an edge appears, on the other hand, since the left and the right polarized states of the light beam are the same linearly polarized light, a difference is produced between the signals obtained by the photodetectors 14 and 15, as mentioned earlier in FIG. 2. Assume, for example, that an edge detection signal 5 becomes a positive signal in the case [III] in which an edge from downward magnetization to upward magnetization appears, and becomes a negative signal in the case [IV] in which an edge from upward magnetization to downward magnetization appears. In this case, the waveform of the edge detection signal 5 is equivalent to that shown in FIG. 8. In this arrangement, the photodetectors 14 and 15 are not two-segment photodetectors, and their positions are not limited to the convergent plane. This facilitates adjustment of the arrangement.

Figure 21:
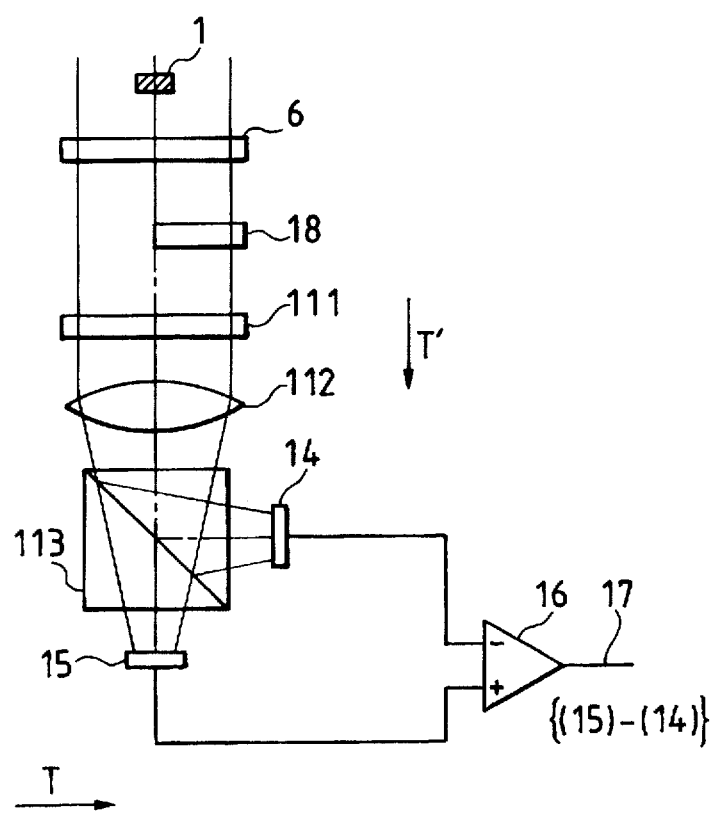
FIG. 21 is a view showing still another reproducing optical system according to the present invention.

FIG. 21 shows a modification of the reproducing optical system shown in FIG. 19. Referring to FIG. 21, a quarter-wave plate 6 has the same function as explained in FIG. 17. A halfwave plate 18 allows one half of a light beam to pass through. The fast axis or the slow axis of the halfwave plate 18 points in the direction of the p-polarized light. The function of the combination of the quarter-wave plate 6 and the halfwave plate 18 is the same as that of the quarter-wave plate 13 with two regions shown in FIG. 19.

Figure 22:
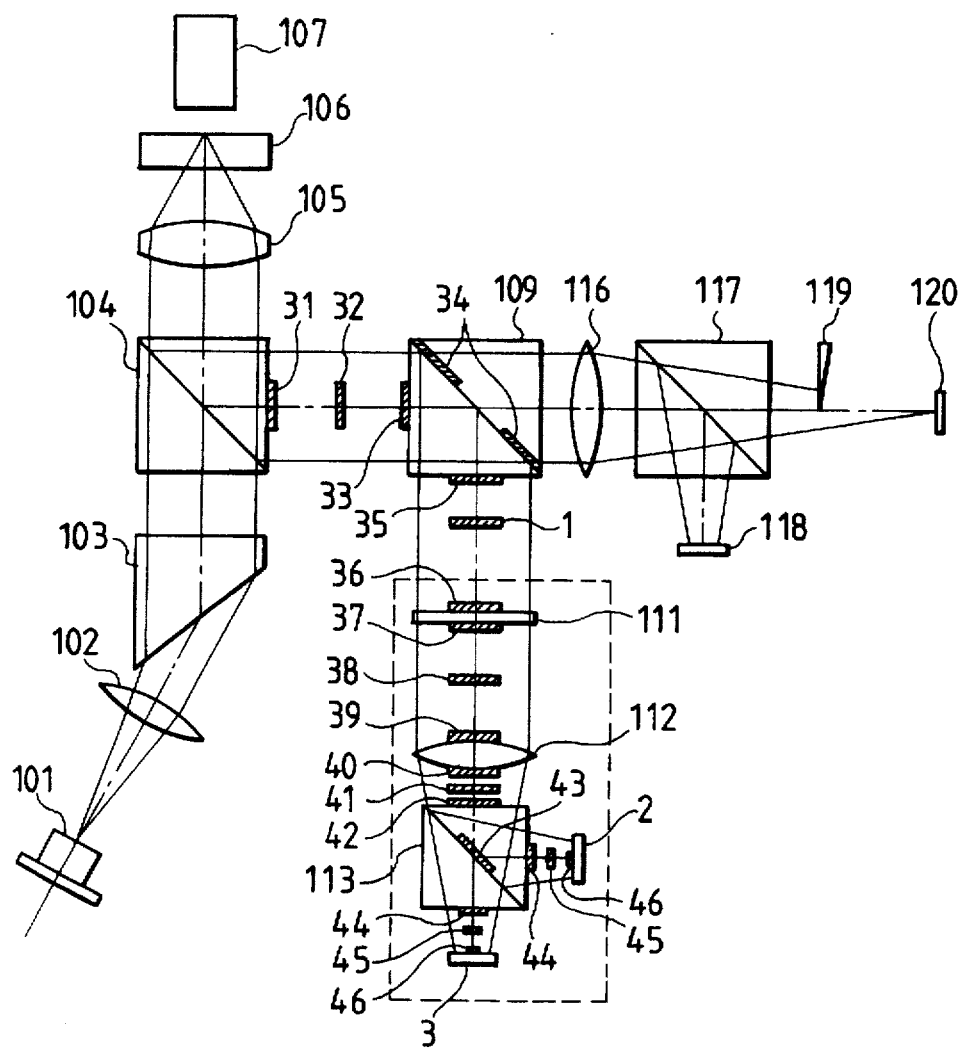
FIG. 22 is a view showing still another reproducing optical system according to the present invention.

The location of the shielding plate 1 as has been described so far is not limited to the positions illustrated in the drawings showing the individual reproducing optical systems but may be any position in a reflected light beam from a magnetooptical information recording medium, provided that the position is before photodetectors. The polarizing beam splitter, on the other hand, splits the reflected light beam from the recording medium to the reproducing optical system and to the optical system for detecting control signals, as described above. Therefore, light can be used more effectively by imparting to this polarizing beam splitter a function of guiding only light to be shielded by the shielding plate to the optical system for detecting control signals and guiding other light components to the reproducing optical system, at the splitting surface of the polarizing beam splitter. FIG. 22 shows positions where the shielding plate can be located. Referring to FIG. 22, the arrangement shown in FIG. 10 is used as a reproducing optical system, and the other portion is the same as that shown in FIG. 1. However, another reproducing optical system can also be used. Instead of the light shielding plate 1, a light shielding plate can be arranged at any of positions denoted by reference numerals 32, 38, 41, and 45. In addition, constituent elements may be vapor-deposited with a shielding substance to essentially function as shielding plates, such as those denoted by reference numerals 31, 33, 35, 36, 37, 39, 40, 42, 43, 44, and 46. Furthermore, a given constituent element, such as the one denoted by reference numeral 34, may be vapor-deposited with a film having a function of transmitting only light to be shielded by the shielding plate to the control optical system and reflecting other light components to the reproducing optical system.

Figure 23:
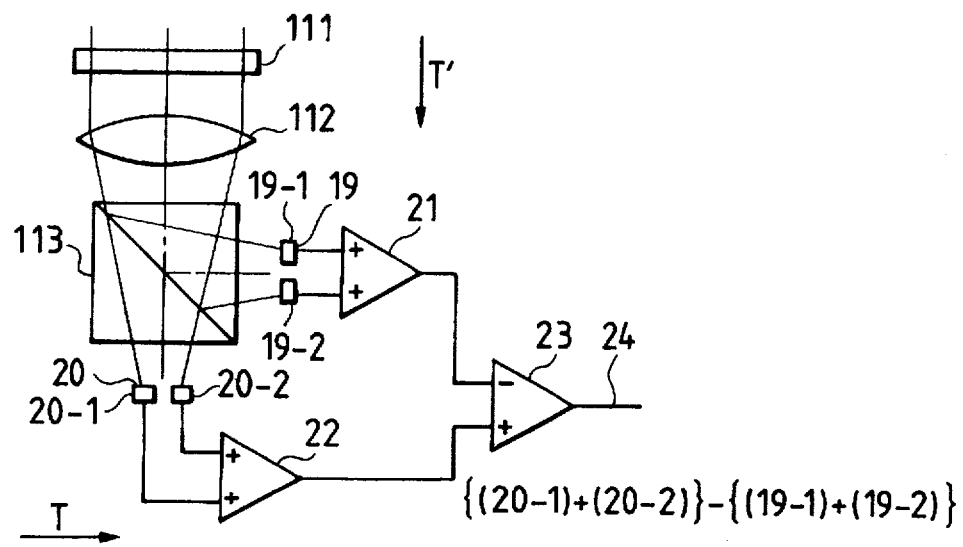
FIG. 23 is a view showing still another reproducing optical system according to the present invention.
Figure 24:
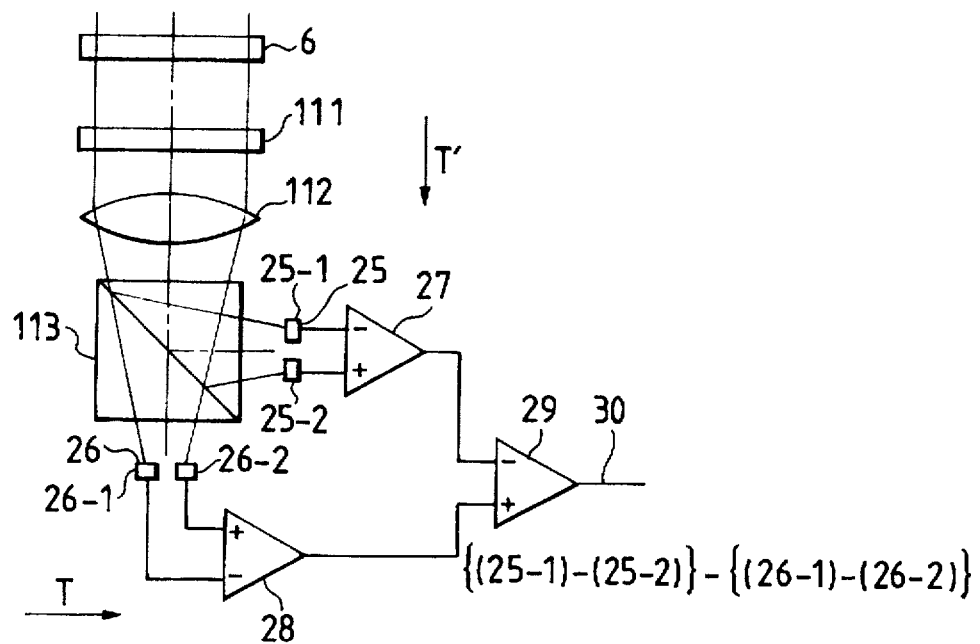
FIG. 24 is a view showing still another reproducing optical system according to the present invention.

As shown in FIGS. 23 and 24, it is also possible to use two-segment photodetectors in each of which a dead zone between two constituent photodetectors is wide, in place of the shielding plate. FIG. 23 illustrates a modification of the embodiment shown in FIG. 10, and FIG. 24 illustrates a modification of the embodiment shown in FIG. 17. Referring to FIGS. 23 and 24, elements 19, 20, 25, and 26 are the two-segment photodetectors each having a wide dead zone. The shielding effect of each two-segment photodetector is determined by the diameter of convergent light incident on the two-segment photodetector and the width of the dead zone. In FIG. 23, a signal 24 obtained by summing amplifiers 21 and 22 and a differential amplifier 23 is equivalent to the signal 5 of the embodiment shown in FIG. 10. In FIG. 24, a signal 30 obtained by differential amplifiers 27, 28, and 29 is equivalent to the signal 12 shown in FIG. 17.

Figure 25:
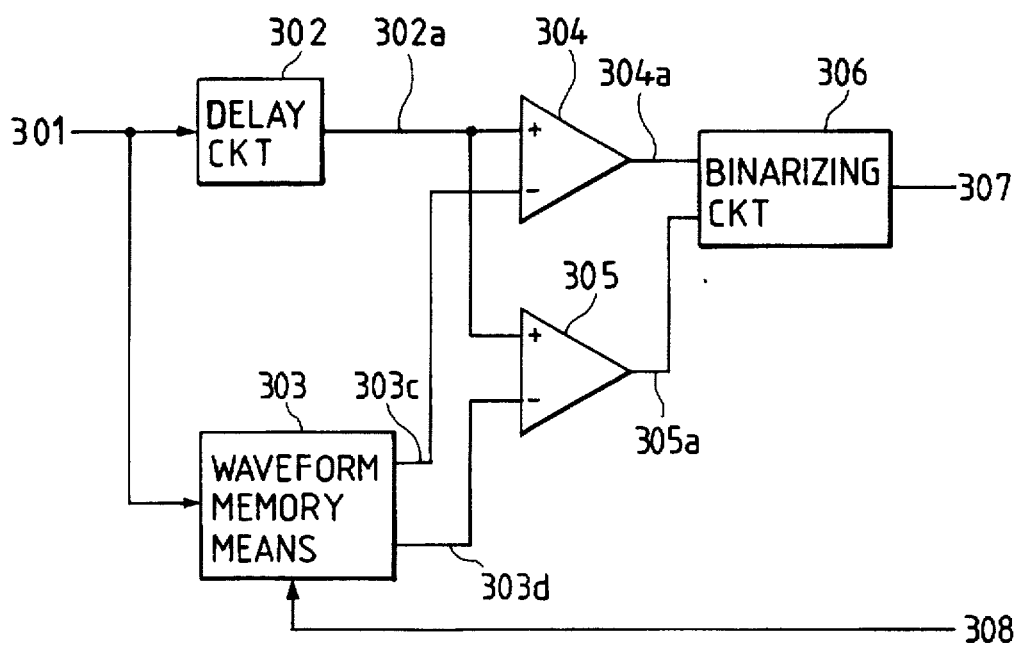
FIG. 25 is a block diagram showing a reproduction signal correction circuit according to still another embodiment of the present invention.

Processing performed for an edge reproduction signal according to the present invention will be described below with reference to FIGS. 25 to 31(e). FIG. 25 is a control block diagram best illustrating the characteristic features of the present invention. Referring to FIG. 25, the optical edge detection signal 126 mentioned earlier in the conventional example (see FIG. 6) is supplied as a reproduction signal 301 to an arithmetic circuit. The arithmetic circuit is constituted by a delay circuit 302, a waveform memory means 303 for storing the waveform of the reproduction signal for a predetermined time period, subtracters 304 and 305 for performing arithmetic processing for the reproduction signal passing through the delay circuit 302 and the signal read out from the waveform memory means 303, and a binarizing circuit 306 for converting the reproduction signal subjected to the arithmetic processing into digital data 307. A clock signal 308 is generated on the basis of the digital data 307.

The operation of this circuit will be briefly described below. First, a peak signal obtained from an information pit larger than a light spot when boundary portions adjacent to the pit are reproduced is stored beforehand in the waveform memory means 303. To reproduce the information, the peak signal is read out from the waveform memory means 303 in synchronism with a peak signal portion as edge information of the reproduction signal 301, and arithmetic processing is performed for the readout peak signal and the reproduction signal. This removes interference components from adjacent edges occurring when a short information pit is processed, producing a corrected reproduction signal as the binary information 307. The delay circuit 302 adjusts the timing of the arithmetic processing, and the clock signal determines the timing at which the waveform is read out from the waveform memory means.

Figure 26:
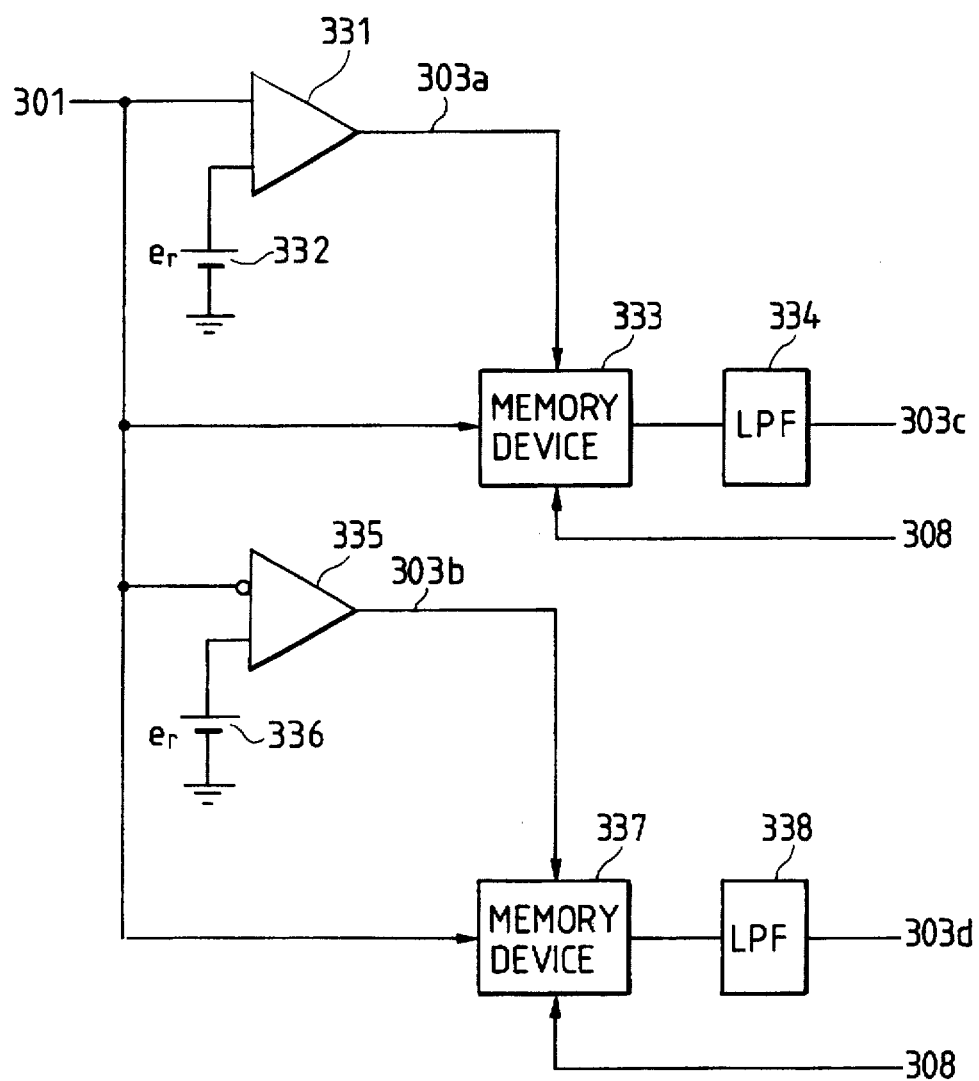
FIG. 26 is a block diagram showing a waveform memory means according to the embodiment shown in FIG. 25.

The operation of the above circuit will be described in more detail below with reference to FIGS. 26 to 31(e). FIGS. 26 and 27(a) through 27(f) illustrate an order of operations for storing a one-shot edge reproduction signal (to be referred to as a peak signal hereinafter) beforehand in order to perform arithmetic processing for the reproduction signal. FIG. 26 is a block diagram showing the waveform memory means. Referring to FIG. 26, the waveform memory means comprises comparators 331 and 335, power sources 332 and 336, memory devices 333 and 337 for storing waveform data, and low-pass filters 334 and 338. The waveform storage operation of this circuit is performed by a control signal from a system controller (not shown). At least three information pits, each of which is longer than a light spot, are recorded adjacent to one another at a predetermined position in an information pit array stored in information tracks of an information recording medium. In this embodiment, a light spot is so scanned as to reproduce the central one of the adjacent long information pits in accordance with the control instruction from the system controller. A signal obtained by reproducing such an information pit is indicated in FIG. 27(a). For the sake of convenience, an edge of an information pit at which downward magnetization changes to upward magnetization will be called a positive edge, and assume that this positive edge corresponds to a positive peak signal shown in FIG. 27(a). On the other hand, an edge of an information pit at which upward magnetization changes to downward magnetization will be called a reverse edge, and assume that this reverse edge corresponds to a negative peak signal shown in (a) of FIG. 27(a). These peak signals change within a time corresponding to the time during which a distance about the diameter of the light spot is scanned. In the example shown in FIG. 27(a) through 27(f), each peak signal corresponds to approximately two cycles of a clock signal generated from the reproduction signal. The reproduction signal 301 as indicated in FIG. 27(a) is supplied to the memory devices 333 and 337 and at the same time to the comparators 331 and 335. One input terminal of the comparator 331 is connected to the power source 332 as a reference voltage source, and the other input terminal receives the reproduction signal 301. At a level higher than a reference voltage $e_r$ as indicated by in FIG. 27(c), a high-level signal of "H" is obtained as a gate signal for extracting the positive peak signal. Note that the power source 332 is set at a minimum level at which the output from the comparator 331 does not go "H" due to signal noise. A gate signal for obtaining the negative peak signal is obtained by the comparator 335. That is, the reproduction signal 301 whose polarity is inverted is supplied to (the inverting input of) the comparator 335, thereby obtaining a signal which is "H" in a portion corresponding to the negative peak signal, as indicated in FIG. 27(e), on the basis of the voltage of the power source 336 as the reference voltage source. By using the gate signals obtained from the reproduction signal, the positive peak signal is stored in the memory device 333, and the negative peak signal is stored in the memory device 337. Referring to FIGS. 27(a) through 27(f), portions N1 to N4 represent waveform distortions produced because the peak signals are stored only during the "H" periods of the gate signals.

The clock signal 308 is also supplied to the memory devices 333 and 337 and used as a reference signal of a time base so that the peak signals are read out later at a timing at which the clock signal rises at the peak position of each peak signal. In this manner, the positive and negative peak signals are stored in the memory devices 333 and 337 and read out as output signals 303c and 303d, respectively.

The information reproducing operation performed by the circuit shown in FIG. 25 will be described next. First, an operation for reproducing the information stored in the waveform memory means 303 shown in FIG. 26 will be described. When the reproduction signal 301 is supplied to the comparators 331 and 335, the comparators 331 and 335 output peak extraction gate signals 303a and 303b to the memory devices 333 and 337, respectively, in the same manner as described above. By using these gate signals 303a and 303b, the memory devices 333 and 337 generate one-shot pulse signals corresponding to the peak positions of the peak signals from clock signals. The memory devices then output the prestored peak signals by using these pulse signals as trigger signals. A series of these operations will be described below with reference to FIGS. 28(a) through 28(g) FIG. 28(a), indicates a reproduction signal. Peaks indicated by symbols A and B are produced by the shortest information pit. These peak signals interfere with each other to shift their respective peak positions in a direction in which they move away from each other. FIG. 28(c) indicates a clock signal. In FIG. 26, when the reproduction signal 301 is input, the comparator 331 outputs the gate signal 303a corresponding to the positive peak (see (d) in FIG. 28). The memory device 333 forms a pulse signal (see (e) in FIG. 28) corresponding to the peak position by using the gate signal 303a and the clock signal 308. The prestored positive peak signal is read out from the memory device 333 by using this pulse signal and output through the low-pass filter (to be referred to as an LPF hereafter) 334 (see (f) in FIG. 28). The LPFs 334 and 338 are used to remove waveform distortions indicated by N1 to N4 in FIG. 27. The peak signal thus read out from the waveform memory means 303 is obtained as a signal which lags behind the positive peak signal of the reproduction signal by one clock. Therefore, to perform arithmetic processing with this signal, the reproduction signal 301 is also delayed by one clock through the delay circuit 302 (see (b) in FIG. 28).

The subtracter 304 calculates the difference between the signals indicated in FIGS. 28(b) and 28(f), yielding a signal indicated in FIG. 28(g), which is formed by extracting only the negative peak signal. As indicated by A' in this signal, the peak shift caused by the positive peak B is removed by subtracting the positive peak signal. As a result, the signal is obtained as a signal whose peak positions are synchronized with the clock signal. FIGS. 29(a) through 29(g) show an operation of obtaining a signal formed by extracting only the positive peak signal in the same manner as described above. As indicated in FIG. 29(g), a positive peak signal B' synchronized with the clock signal is obtained.

Figure 30:
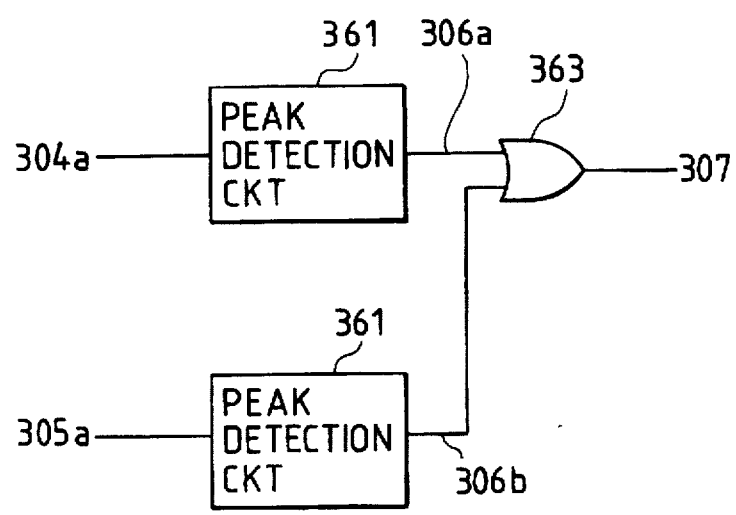
FIG. 30 is a block diagram for explaining the operation of the reproduction signal correction circuit shown in FIG. 25.
Figure 31A:
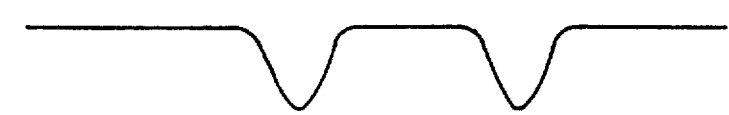
FIGS. 31(a) through 31(e) are timing charts for explaining the operation of the reproduction signal correction circuit shown in FIG. 25.
Figure 31B:
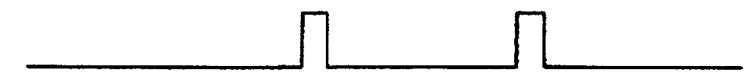
Figure 31C:
Figure 31D:
Figure 31E:
Figure 32:
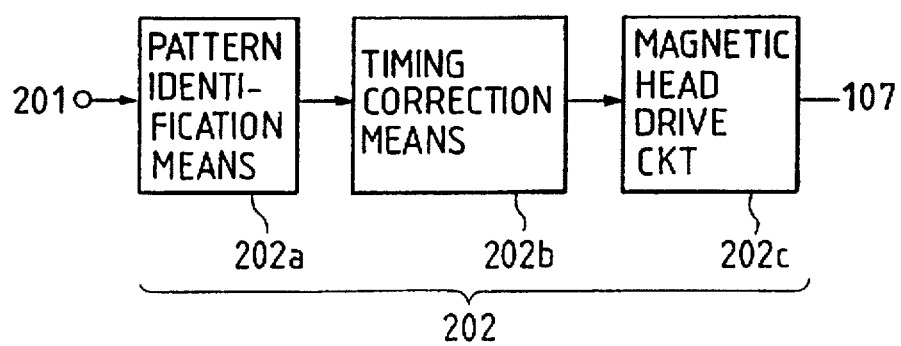
FIG. 32 is a block diagram showing a recording compensation means according to still another embodiment of the present invention.

An operation of obtaining a binarized digital signal from the two peak signals obtained as described above will be described with reference to FIGS. 30 and 31(a) through 31(g). FIG. 30 is a view for explaining the binarizing circuit 306 shown in FIG. 25. Referring to FIG. 30, this binarizing circuit includes peak detection circuits 361 and 362 and an OR gate 363. The peak detection circuits 361 and 362 are parts generally used for fixed magnetic disks, each of which functions to differentiate a peak signal to obtain a peak position from the zero-cross position, generating a one-shot clock pulse. Therefore, a negative peak signal string 304a (see in FIG. 31(a)) and a positive pulse signal string 305a (see in FIG. 31(c)) obtained from the reproduction signal are supplied to the peak detection circuit 361 and the peak detection circuit 362, respectively, and resulting outputs 306a and 306b (see FIGS. 31(b) and 31(d) are supplied to the OR gate 363, thereby obtaining the binary signal 307 (see in FIG. 31(e)). In this manner, the reproduction signal that has caused peak shifts can be binarized correctly.

In this embodiment, the two memory devices are provided in the waveform memory means to store the waveforms of reproduction signals in the vicinity of magnetization inversion of different polarities. It is, however, also possible to use only one memory device to store only the waveform of a reproduction signal in the vicinity of magnetization inversion of one polarity. In read-out of the waveform, the same effect as described above can be obtained by performing arithmetic processing with the reproduction signal by using the above signal directly or by using a signal formed by inverting the polarity of the above signal through the use of an electrical circuit. If the positive peak signal and the negative peak signal of the reproduction signal are not equivalent for some reasons, it is desirable that two memory devices be used to store the positive peak signal and the negative peak signal independently, as in the above embodiment.

In summary, a magnetooptical information recording and reproducing apparatus for magnetoopotically edge-recording information by radiating, via an optical head, laser light onto a magnetooptical information recording medium, which records information pits by using the difference in the direction of magnetization, and in which the significance of information is given to the boundary of each information pit, and applying a magnetic field to this irradiated portion, and/or edge-reproducing the information by optically detecting the boundaries (edges) of the information pits from reflected light by using photodetectors, and detecting the boundary of each information pit from a position at which the detection signal exhibits a peak value, comprises waveform memory means for storing the waveform of a reproduction signal for a predetermined time period, and reading means for reading out the waveform of the reproduction signal stored beforehand in the waveform memory means in synchronism with a reproduction clock signal. In this magnetooptical information recording and reproducing apparatus, the information is reproduced by using a signal, which is obtained by performing arithmetic processing for the waveform of the actual edge reproduction signal and the waveform of the readout reproduction signal, as a new reproduction signal.

The above waveform memory means is a memory device which stores the waveform of a reproduction signal at a position where magnetization of one polarity is inverted to the other in the vicinity of a boundary where information pits longer than the diameter of a light spot continue. The waveform memory means reads out the waveform of the prestored reproduction signal by using the reading means and performs arithmetic processing for the readout reproduction signal and the actual edge reproduction signal. This consequently generates a reproduction signal consisting of only the portion of inversion from upward magnetization to downward magnetization and a reproduction signal consisting of only the portion of inversion from downward magnetization to upward magnetization, thereby reproducing the information.

FIGS. 32 to 37 are views for explaining still another embodiment of the present invention. The arrangement of an optical system of this embodiment is the same as that of the conventional example shown in FIG. 1, so the following description will be made with reference to FIG. 1. In a magnetooptical information recording and reproducing apparatus shown in FIG. 1, a recording operation based on a magnetic field modulation recording scheme is achieved as follows. That is, a light spot is formed on the surface of a recording medium with the output from a semiconductor laser 101 kept at a high intensity. To apply an external magnetic field to the vicinity of a position corresponding to this light spot, movement of a magnetic head 107 is controlled, and a drive current which is modulated at a high rate on the basis of recording data is flowed through the coil of the magnetic head. In the present invention, however, although the apparatus shown in FIG. 1 is used, the recording timing is corrected in accordance with the pattern of recording data, and the magnetic head 107 is driven by a recording compensation means 202 at this corrected recording timing. That is, in FIG. 32, upon receiving recording data 201, a pattern identification means 202a identifies and classifies a digital signal modulated by a predetermined modulation scheme into three parts, i.e., 0, 1, and an inversion portion. These three parts are a leading inversion position, a trailing inversion position, and a normal inversion position of a portion corresponding to a minimum inversion interval. If several minimum inversion intervals continue, the most leading inversion position is defined as the leading inversion position, the most trailing inversion position is defined as the trailing inversion position, and inversion positions sandwiched between them are defined as normal inversion positions for the reason to be explained later. Three types of inversion position extraction signals corresponding to these three types of inversion positions thus identified are output.

When these inversion position extraction signals are applied to a timing correction means 202b, timing correction of a predetermined amount (to be described in detail later) corresponding to an edge shift caused by intersymbol interference which occurs during reproduction, as mentioned earlier in the conventional example, is performed for a recording data signal, and a recording signal thus corrected is output. This corrected recording signal is supplied to a magnetic head drive circuit 202c of a conventional type, thereby driving the magnetic head 107. In this manner, the recording compensation means 202 performs recording of the present invention.

Figure 33:
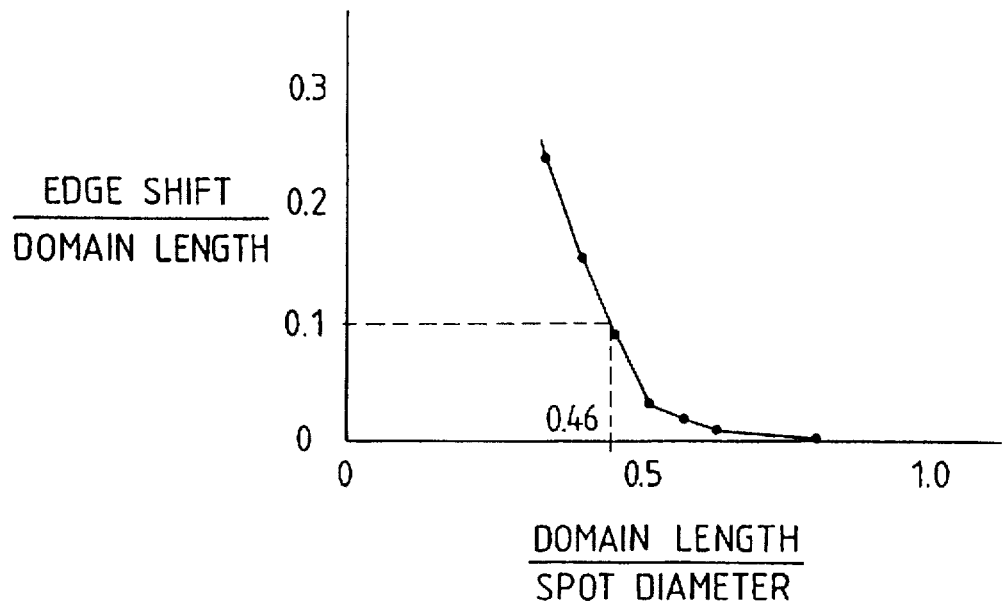
FIG. 33 is a graph for explaining edge shifts occurring in reproduction in the embodiment shown in FIG. 32.

Edge shifts caused by intersymbol interference occurring in reproduction when recording is performed by a conventional method using no recording compensation means will be described first with reference to FIGS. 33 and 34(a) and 34(b). FIG. 33 shows a comparison between a domain length used in recording and a domain length obtained from a reproduction signal when a repeating pattern of 3T, 1T, and 4T, in which T is the unit length of a domain length, is recorded as shown in FIG. 4(a) and (b) or 9(a) and (b). More specifically, a time interval between the peaks of an edge reproduction signal of a recorded domain corresponding to 1T is obtained, and the domain length of the reproduction signal is calculated from the rotating speed of a disk and the scan rate of a light spot, which is obtained from the radius of the disk. Referring to FIG. 33, the abscissa represents a recorded domain length which is normalized by the spot diameter (a diameter when the light intensity reaches its peak, $1/e^2$). The ordinate represents a value which is one half of the difference between the domain length obtained from the edge reproduction signal and the recorded domain length (this value corresponds to an edge shift because it represents a change amount in domain length on one side), and is normalized with respect to the recorded domain length. As can be seen from FIG. 33, edge shifts begin to appear when the recorded domain length becomes equal to or smaller than the spot diameter, and increase abruptly when the recorded domain length becomes ½ or less the spot diameter. Therefore, when recording is performed at a high density at which the smallest recorded domain length is ½ or less the spot diameter, the occurrence of edge shifts cannot be neglected as shown in FIG. 33. Note that in the experiment for demonstrating this, the wavelength, the spot diameter, and the scan rate were set at 830 nm, 1.7 μm, and 7.5 m/s, respectively.

Figure 34A:
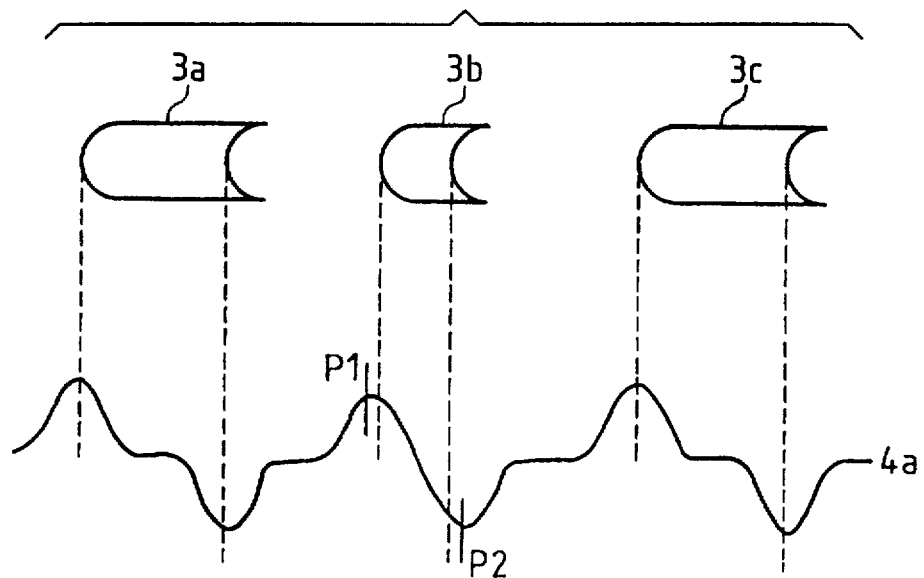
FIGS. 34(a) and 34(b) are views for explaining edge shifts occurring in reproduction in the embodiment shown in FIG. 32.
Figure 34B:
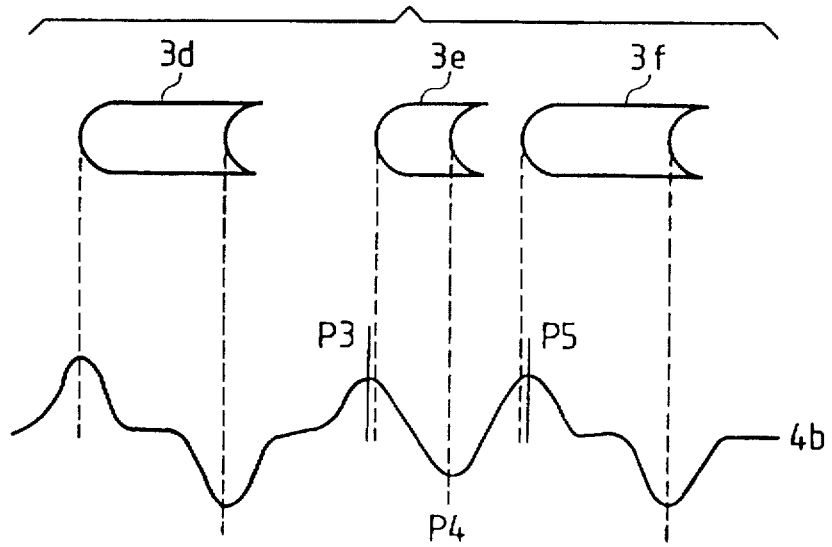

FIGS. 34(a) and 34(b) show edge reproduction signals when practical digital patterns are recorded. FIG. 34(a) shows a reproduction signal when digital data [1111000011000001111] subjected to (1–7) RLL modulation is recorded. A central recorded domain 3*b* as the shortest recorded domain corresponds to [11], which is a region of inversion of magnetization in which the leading end side corresponds to [0000] and the trailing end side corresponds to [00000]. Assuming that the length of this shortest domain 3*b* is 0.46 the spot diameter, an edge shift is 0.1 as shown in FIG. 33. Therefore, as indicated by 4*a* in FIG. 34(*a*), reproduction signals P1 and P2 are shifted forward and backward, respectively, by 10% from the edge of the recorded domain.

If, on the other hand, digital data [1111000011001111] as indicated in FIG. 34(*b*) is recorded, i.e., if a domain of inversion with the same length as that of the shortest domain 3*e* is adjacent to the domain 3*e*, edge shifts occur in a different way. That is, an edge P3 of a reproduction signal on the leading end side of the recorded domain 3*e* is shifted 10% toward the leading end, as in the case of FIG. 34(*a*). At a peak P4 on the trailing end side of the recorded domain 3*e*, edge shifts cancel each other out to be zero because the following inversion domain is also the shortest domain. A peak P5 on the trailing end side of the inversion domain subsequent to the recorded domain 3*e* is shifted 10% toward the trailing end as in the case in FIG. 34(*a*). Possible domain lengths when data subjected to (1–7) RLL modulation is recorded as described above are seven types, 2T, 3T, 4T, 5T, 6T, 7T, and 8T assuming that 2T is the smallest domain length. If a domain length corresponding to this 2T is 0.46 shown in FIG. 33, the second smallest domain length 3T is 0.69, and the corresponding edge shift is a negligible one, 0.05 or less. That is, when digital data to be recorded has a random pattern, only an edge signal consisting of the smallest domain length produces an edge shift that cannot be ignored. If, however, recorded domains with the smallest domain length continue, edge shifts occur at both the most leading edge and the most trailing edge. The above consideration means that three different edge shift occurrence patterns are possible: in the first one, the most leading edge of an isolated shortest domain or of adjacent shortest domains is shifted toward the leading end, in the second one, the most trailing edge of an isolated shortest domain or of adjacent shortest domains is shifted toward the trailing end, and in the third one, no edge shift occurs.

As described above, in digital recording performed at a high density, the directions and the magnitudes of edge shifts in a conventional edge reproduction signal can be predicted from the digital pattern recorded. Therefore, by identifying during recording which of the above three edge shift occurrence patterns each portion (edge position) of inversion between 0 and 1 of digital data corresponds to, and by correcting the timing of inversion of a magnetic field applied from the magnetic head 107 so as to cancel this edge shift, occurrence of edge shifts during reproduction can be prevented, and this makes correct reproduction of the digital data possible.

Figure 35:
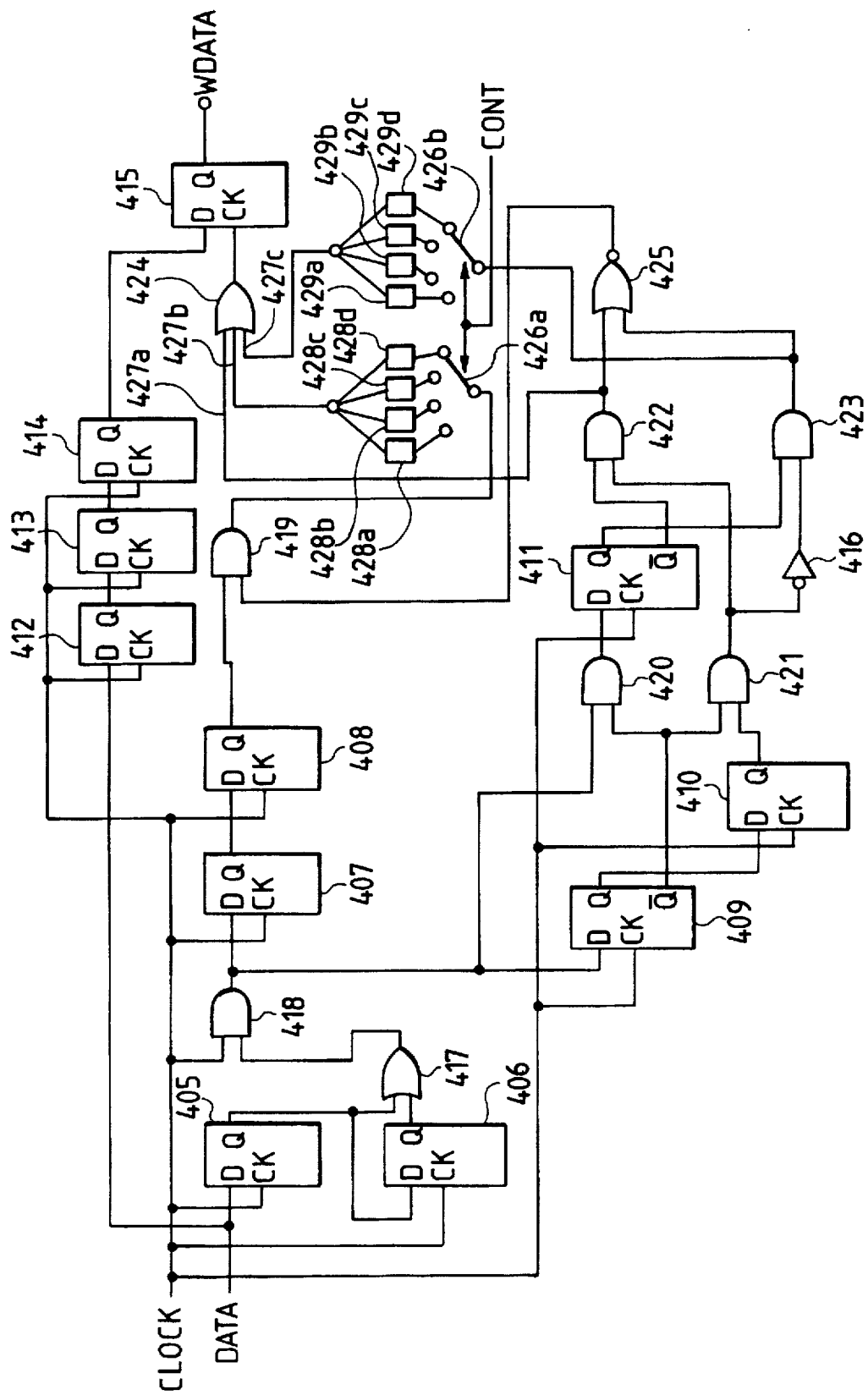
FIG. 35 is a circuit diagram showing a circuit for performing pattern identification for digital data and timing correction.
Figure 36A:
FIGS. 36(a) through 36(j) are timing charts for explaining the operation of the circuit for performing pattern identification for digital data and timing correction shown in FIG. 35.
Figure 36B:
Figure 36C:
Figure 36D:
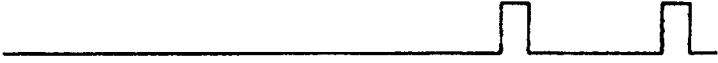
Figure 36E:
Figure 36F:
Figure 36G:
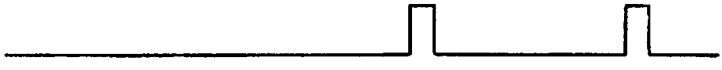
Figure 36H:
Figure 36I:
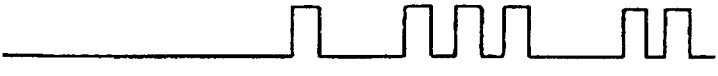
Figure 36J:

FIGS. 35 and 36(*a*) through 36(*j*) illustrate a practical embodiment for performing the pattern identification and the timing correction as described above. FIG. 35 is a circuit diagram showing the arrangement of this circuit, and FIGS. 36(*a*) through 36(*j*) are timing charts for explaining the operation of the circuit. Referring to FIG. 35, this circuit includes flip-flops 405 to 415, a NOT gate 416, an exclusive-OR gate 417, AND gates 418 to 423, OR gates 424 and 425, a switch 426, and delay circuits 428 and 429. Suppose digital data (DATA) to be recorded and a clock signal (CLOCK) are input to this circuit. The signal waveform of CLOCK is indicated in FIG. 36(*a*), and the signal waveform of DATA is indicated in FIG. 36(*b*). The DATA signal is formed into a signal which goes "1" for one period at an inversion position between "0" and "1" by the flip-flops 405 and 406 and the exclusive-OR gate 417. The AND gate 418 ANDs this signal and the clock signal to form a signal in which clock pulses rise at inversion between "0" and "1." Since, however, this signal has passed through the flip-flops once, the signal lags behind the DATA signal by one clock period as indicated in FIG. 36(*c*).

Subsequently, the pulse corresponding to the inversion portion between "0" and "1" is supplied to the circuit for identifying signals in correspondence with the three different conditions described above. First, the output from the OR gate 418 is supplied to the flip-flop 409 and delayed by one clock. The inverted output [–Q] from the flip-flop 409 is supplied to the AND gate 420 which also receives the output from the AND gate 418, and the output from the AND gate 420 is supplied to the flip-flop 411 and delayed by one clock. To delay the positive output [Q] from the flip-flop 409 by one more clock, the positive output [Q] is supplied to the flip-flop 410. The resulting output from the flip-flop 410 and the inverted output [–Q] from the flip-flop 409 are supplied to the AND gate 421. Thereafter, the inverted output [–Q] from the flip-flop 411 and the output from the AND gate 421 are supplied to the AND gate 422. The resulting output is a signal (see in FIG. 36(*d*)) in which pulses rise only in a portion corresponding to the most trailing inversion position of an isolated shortest domain or of adjacent shortest domains.

The output from the AND gate 421, on the other hand, is inverted by the NOT gate 416, and the inverted signal and the positive output [Q] from the flip-flop 411 are supplied to the AND gate 423. This yields an output signal (see in FIG. 36(*e*)) in which pulses rise only in a portion corresponding to the most leading inversion position of an isolated shortest domain or of adjacent shortest domains. In addition, the outputs from the AND gates 422 and 423 are supplied to the NOR gate 425. The output from the NOR gate 425 and a signal obtained by delaying the output from the AND gate 418 described above by two clocks through the flip-flops 407 and 408 are supplied to the AND gate 419. The resulting output signal is a signal (see in FIG. 36(*f*)) in which pulses rise only in an inversion portion of "0" and "1" except for an inversion position related to the shortest inversion interval or an inversion position of the most leading or trailing portion of a portion forming adjacent shortest inversion intervals.

To give delays independently to the signals, ((FIGS. 36(*d*), 36(*e*) and 36(*f*)) formed by separating inversion portions of "0" and "1" in correspondence with the three different cases mentioned above, an output signal 427*a* from the AND gate 422, a signal 427*c* formed by passing the output from the AND gate 423 through the switch 426 and the delay circuit 429, and a signal 427*b* formed by passing the output from the AND gate 419 through the switch 426 and the delay circuit 428 are supplied to the OR gate 424. The output signal from the OR gate 424 becomes an inversion position signal (see in FIG. 36(*i*)) formed by performing different types of timing correction for the three types of inversion positions already identified.

By extracting the DATA signal supplied to the flip-flop 415 by using the above signal as a clock signal, it is possible to obtain a DATA signal (see in FIG. 36(*j*)) to be recorded actually, which is corrected in recording timing. Since the output from the OR gate 424 lags behind the DATA signal by three clocks, the DATA signal to be supplied to the flip-flop 415 is delayed by three clocks through the three flip-flops 412 to 414 so as to obtain coincidence between the data patterns. With this operation of the circuit shown in FIG. 35, the input DATA signal indicated in FIG. 36(b) is converted into the signal in FIG. 36(j) which is obtained by performing timing correction for the original DATA signal indicated by a dotted line; that is, the signal is formed by giving different timing correction amounts to the three types of inversion positions described above.

Figure 37:
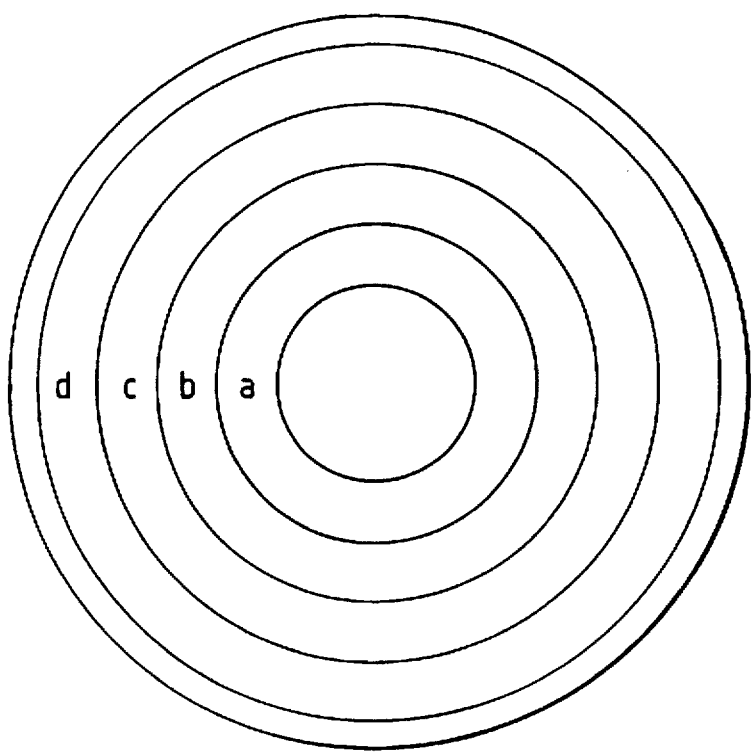
FIG. 37 is a plan view for explaining an information recording medium used in the above embodiment.

In FIG. 35, a plurality of delay circuits 428a to 428d and 429a to 429d can be selected by switches 426a and 426b operated in association with each other by a control signal from a control unit (not shown). This is so because when a disk-like recording medium is rotated at a constant rotating speed, the scan rate changes due to the difference in radius between information tracks and the timing correction amount described above must be changed accordingly. More specifically, as shown in FIG. 37, an area on the disk-like recording medium is divided into four regions a, b, c, and d, and delay amounts corresponding to the individual regions are selected. For example, in the circuit shown in FIG. 35, a control computer (not shown) determines which of the regions a, b, c, and d is used in recording from address information of an information track, and outputs a control signal (CONT.) to control the switches 426.

In recording and reproduction of optical disks performed by a constant linear velocity scheme in which the rotating speed is varied continuously in correspondence with the disk radius in order to scan a light spot on an information track at a constant velocity, the predetermined effect of the present invention can be obtained by directly performing the above embodiment. In this case, since the linear velocity is constant, the timing correction amounts shown in FIG. 35 are the same. Therefore, only one set of delay circuits needs to be provided, and this makes the use of the switches 426 unnecessary. As a result, the arrangement of the operating circuit is more simplified. The present invention is also similarly applicable to an optical recording and reproducing system in which a recording medium is generally scanned at a uniform linearly velocity, and can be preferably applied to an optical tape apparatus.

To recapitulate, a magnetooptical information recording and reproducing apparatus for magnetoopotically edge-recording information by radiating, via an optical head, laser light onto a magnetooptical information recording medium, which records information pits by using the difference in the direction of magnetization, and in which the significance of information is given to the boundary of each information pit, and applying a magnetic field to this irradiated portion, and/or edge-reproducing the information by optically detecting the boundaries (edges) of the information pits from reflected light by using photodetectors, and detecting the boundary of each information pit from a position at which the detection signal exhibits a peak value, comprises identification means for receiving digital data and identifying the direction and the amount of a shift of a boundary position of an information pit obtained from a reproduction signal generated when the digital data is recorded and then reproduced, and timing correction means for changing a recording timing for the information recording medium so as to cancel the shift amount and the shift direction identified by the identification means.

The timing correction means is so arranged as to select one of three processing activities of advancing the recording timing by a predetermined time, delaying it by a predetermined time, and performing no timing correction, in accordance with the output from the identification means.

The timing correction means is also arranged so as to use a plurality of timing correction amounts selectively in accordance with the radius of an information track to be recorded.

According to the present invention as has been described above, in a magnetooptical information recording and reproducing apparatus for magnetoopotically recording information by radiating, via an optical head, laser light onto a magnetooptical information recording medium which records information pits by using the difference in the direction of magnetization, and applying a magnetic field to this irradiated portion, and/or optically reproducing the information by detecting light reflected by the irradiated portion by using photodetectors, a band-like shielding plate is arranged in an optical path of the reflected light from the magnetooptical recording medium in a direction perpendicular to tracks of the magnetooptical information recording medium, and the information is reproduced by detecting light beams not shielded by the shielding plate by using the photodetectors. This can provide an effect of improving relative frequency characteristics and/or reducing noise components, and an effect of reducing intercode interference.

In addition, according to the present invention, a magnetooptical information recording and reproducing apparatus for performing edge recording and edge reproduction of information by using an interaction between light, heat, and magnetism for a magnetooptical information recording medium which has a plurality of tracks and records information pits by using the difference in the direction of magnetization, in which the edge of each information pit is detected optically by reflected light from the information recording medium, and the boundary of the information pit is detected from a position at which the detection signal exhibits a peak value, thereby reproducing the information, comprises waveform memory means for storing the waveform of a reproduction signal for a predetermined time period, and reading means for reading out a signal waveform stored beforehand in the waveform storage means in synchronism with a reproduction clock signal. In this magnetooptical information recording and reproducing apparatus, the information is reproduced by using a signal, which is obtained by performing arithmetic processing for the waveform of the reproduction signal and the waveform of the readout signal, as a new reproduction signal. Therefore, when recording is performed at a high density, peak shifts occurring in reproduction of short information pits can be corrected, thereby performing accurate information reproduction.

Furthermore, according to the present invention, when an edge recording and reproducing system is adopted in a magnetooptical information recording and reproducing apparatus, edge shifts supposed to occur during reproduction are predicted from a digital pattern to be recorded, and recording timings are so corrected as to cancel these edge shifts. This makes it possible to reproduce data recorded at a high density more accurately than in conventional apparatuses.

What is claimed is:

1. A magnetooptical information recording and reproducing apparatus comprising:

radiating means for radiating a spot light beam onto a track containing information on information pits on a magnetooptical recording medium having a plurality of tracks;

applying means for applying a predetermined magnetic field to the recording medium;

shielding means for shielding a central portion of the light beam from the recording medium, said shielding means having a band-like shielding plate corresponding to a direction perpendicular to the tracks of the recording medium; and reproducing means for reproducing the information from the information containing track, radiated with the spot light beam, by detecting only portions of the light beam other than the central portion shielded by said shielding means, and by detecting a boundary of an information pit on the recording medium.

2. An apparatus according to claim 1, wherein the width of said shielding plate is about not more than 0.3 times the diameter of the light beam shielded by said shielding means.

3. An apparatus according to claim 1, wherein the minimum length along a track on the recording medium of an information pit recorded on the track is not more than half the diameter of the spot light beam radiated by said radiating means for reproducing information.

4. A magnetooptical information recording/reproducing apparatus comprising:

radiating means for radiating a spot light beam onto a track containing information on information pits on a magnetooptical recording medium having a plurality of tracks;

shielding means for shielding a central portion of the light beam from the recording medium, said shielding means having a band-like shielding plate corresponding to a direction perpendicular to the tracks of the recording medium; and means for reproducing the information from the information containing track, radiated with the spot light beam, by detecting only portions of the light beam other than the central portion shielded by said shielding means, and by detecting a boundary of an information pit on the recording medium.

5. An apparatus according to claim 4, wherein the width of said shielding plate is about not more than 0.3 times the diameter of the light beam shielded by said shielding means.

6. An apparatus according to claim 4, wherein the minimum length along a track on the recording medium of an information pit recorded on the track is not more than half the diameter of the spot light beam radiated by said radiating means for reproducing information.

7. An optical information recording/reproducing apparatus comprising:

radiating means for radiating a spot light beam onto a track containing information on information pits on an optical recording medium having a plurality of tracks;

shielding means for shielding a central portion of the light beam from the recording medium, said shielding means having a band-like shielding plate corresponding to a direction perpendicular to the tracks of the recording medium; and means for reproducing the information from the information containing track, irradiated with the spot light beam, by detecting only portions of the light beam other than the central portion shielded by said shielding means, and by detecting a boundary of an information pit on the recording medium.

8. An apparatus according to claim 7, wherein the width of said shielding plate is about not more than 0.3 times the diameter of the light beam shielded by said shielding means.

9. An apparatus according to claim 7, wherein the minimum length along a track on the recording medium of an information pit recorded on the track is not more than half the diameter of the spot light beam radiated by said radiating means for reproducing information.

* * * * *

UNITED STATES PATENT AND TRADEMARK OFFICE
CERTIFICATE OF CORRECTION

PATENT NO. : 5,841,755

DATED : November 24, 1998

INVENTORS : MASAKUNI YAMAMOTO, ET AL.

It is certified that error appears in the above-identified patent and that said Letters Patent is hereby corrected as shown below:

COLUMN 3:

line 7, "Figure and" should read --figure--.

COLUMN 4:

line 27, "FIG. 5(c)" should read --(FIG. 5(c))--; and
line 28, "FIG. 5(d)." should read --(FIG. 5(d)).--.

COLUMN 5:

line 16, "FIG. 5(5)," should read --FIG. 5(c),--.

COLUMN 6:

line 28, "122-2) (" should read --122-2)-(--.

UNITED STATES PATENT AND TRADEMARK OFFICE
CERTIFICATE OF CORRECTION

PATENT NO. : 5,841,755

DATED : November 24, 1998

INVENTORS : MASAKUNI YAMAMOTO, ET AL.

It is certified that error appears in the above-identified patent and that said Letters Patent is hereby corrected as shown below:

COLUMN 8:

line 1, "magnetoopotically" should read --magnetooptically--;
    line 16, "magnetoopotically" should read --magnetooptically--; and
    line 35, "magnetoopotically" should read --magnetooptically--.

COLUMN 11:

line 7, "receive" should read --receives--.

COLUMN 12:

line 46, "magnetoopotically" should read --magnetooptically--.

COLUMN 13:

line 27, "w=0" should read --w=0,--.

UNITED STATES PATENT AND TRADEMARK OFFICE
CERTIFICATE OF CORRECTION

PATENT NO. : 5,841,755

DATED : November 24, 1998

INVENTORS : MASAKUNI YAMAMOTO, ET AL.

It is certified that error appears in the above-identified patent and that said Letters Patent is hereby corrected as shown below:

COLUMN 15:

line 5, "magnetoopotically" should read --magnetooptically--;
    line 34, "5(d)" should read --5(d).--; and
    line 65, "indicate, (a) indicates" should read --indicate--.

COLUMN 18:

lines 13 and 14 "to a" should read --to the--.

COLUMN 22:

line 7, "28(g) FIG. 28(a)," should read --28(g). FIG. 28(a)--.

COLUMN 24:

line 32, "FIGS. 33 and" should read --FIGS. 33,--.

COLUMN 26:

line 40, "in FIG." should read --FIG.--; and
    line 46, "((FIGS." should read --(FIGS.--.

UNITED STATES PATENT AND TRADEMARK OFFICE
CERTIFICATE OF CORRECTION

PATENT NO. : 5,841,755

DATED : November 24, 1998

INVENTORS : MASAKUNI YAMAMOTO, ET AL.

It is certified that error appears in the above-identified patent and that said Letters Patent is hereby corrected as shown below:

COLUMN 27:

line 40, "magnetoopotically" should read --magnetooptically--.

COLUMN 28:

line 3, "magnetoopotically" should read --magnetooptically--.

Signed and Sealed this

Twentieth Day of July, 1999

Attest:

Q. TODD DICKINSON

*Attesting Officer*          *Acting Commissioner of Patents and Trademarks*

UNITED STATES PATENT AND TRADEMARK OFFICE
CERTIFICATE OF CORRECTION

PATENT NO. : 5,841,755

DATED : November 24, 1998

INVENTORS : MASAKUNI YAMAMOTO, ET AL.

It is certified that error appears in the above-identified patent and that said Letters Patent is hereby corrected as shown below:

<u>ON THE COVER PAGE</u> item [63], under "Related U.S. Application Data", "Continuation of Ser. No. 138,118, Oct. 10, 1993, abandoned." should read --Continuation of Ser. No. 138,118, Oct. 20, 1993, abandoned.--.

Signed and Sealed this

Twelfth Day of October, 1999

*Attest:*

Q. TODD DICKINSON

*Attesting Officer*     Acting Commissioner of Patents and Trademarks